United States Patent
Mihara et al.

(10) Patent No.: US 9,215,415 B2
(45) Date of Patent: Dec. 15, 2015

(54) COMMUNICATION SERVER, COMMUNICATION SYSTEM, AND COMMUNICATION METHOD

(71) Applicants: Akihiro Mihara, Tokyo (JP); Takahiro Asai, Kanagawa (JP)

(72) Inventors: Akihiro Mihara, Tokyo (JP); Takahiro Asai, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 23 days.

(21) Appl. No.: 14/203,981

(22) Filed: Mar. 11, 2014

(65) Prior Publication Data

US 2014/0267567 A1    Sep. 18, 2014

(30) Foreign Application Priority Data

Mar. 12, 2013  (JP) .................................. 2013-049213

(51) Int. Cl.
*H04N 7/14* (2006.01)
*H04N 7/15* (2006.01)
*H04L 29/06* (2006.01)

(52) U.S. Cl.
CPC .............. *H04N 7/152* (2013.01); *H04L 65/403* (2013.01); *H04L 65/4023* (2013.01)

(58) Field of Classification Search
CPC ... H04N 7/152; H04L 65/403; H04L 65/4023
USPC ....................................................... 348/14.08
See application file for complete search history.

(56) References Cited

U.S. PATENT DOCUMENTS

| | | |
|---|---|---|
| 2012/0047554 A1 | 2/2012 | Mihara et al. |
| 2013/0038676 A1 | 2/2013 | Tanaka et al. |
| 2013/0227015 A1 | 8/2013 | Mihara et al. |
| 2013/0242033 A1 | 9/2013 | Kato et al. |
| 2013/0242038 A1 | 9/2013 | Umehara et al. |
| 2014/0074932 A1* | 3/2014 | Mihara et al. ................. 709/204 |

FOREIGN PATENT DOCUMENTS

| | | |
|---|---|---|
| JP | 2011-254453 | 12/2011 |
| JP | 2012-134941 | 7/2012 |
| JP | 2012-134944 | 7/2012 |
| JP | 2013-175059 | 9/2013 |

* cited by examiner

*Primary Examiner* — Creighton Smith
(74) *Attorney, Agent, or Firm* — Oblon, McClelland, Maier & Neustadt, L.L.P.

(57) ABSTRACT

A communication server includes a checking unit that checks a terminal management table, a determination unit that determines whether group identification information of a first terminal of a plurality of terminals participating in a videoconference is a same as group identification of a second terminal of the plurality of terminals based on group identification data from the terminal management table, an updating unit that updates a shared location table including shared location information indicating a location of a shared memory area shared by the same group when the group identification information of each of the first and second terminals is determined as being the same, a memory access information creation unit that creates memory access information for accessing the shared memory area, and a notification unit that sends a notification of the shared location information and the memory access information to the same group.

9 Claims, 26 Drawing Sheets

FIG.6

| TERMINAL ID | GROUP NAME |
|---|---|
| 0001 | A1 |
| 0002 | A1 |
| 0003 | A2 |
| 0004 | A2 |
| 0005 | ... |
| 0006 | ... |
| 0007 | ... |
| ... | ... |

FIG.7

| SESSION ID | TERMINAL ID | GROUP NAME | SHARED FOLDER URI | ACCOUNT NAME | PASSWORD |
|---|---|---|---|---|---|
| 01 | 0001, 0002, 0003, 0004, 0005 | ALL | http://kaigi.com/share/01_ALL | acc1 | 11111111 |
|  | 0001, 0002 | A1 | http://kaigi.com/share/01_A1 | acc2 | 22222222 |
|  | 0003, 0004 | A2 | http://a-intra.com/share/01_A2 | acc3 | 33333333 |
| 02 | 0006, 0007 | ALL | http://kaigi.com/share/02_ALL | acc4 | 44444444 |
| ... | ... |  | ... | ... | ... |

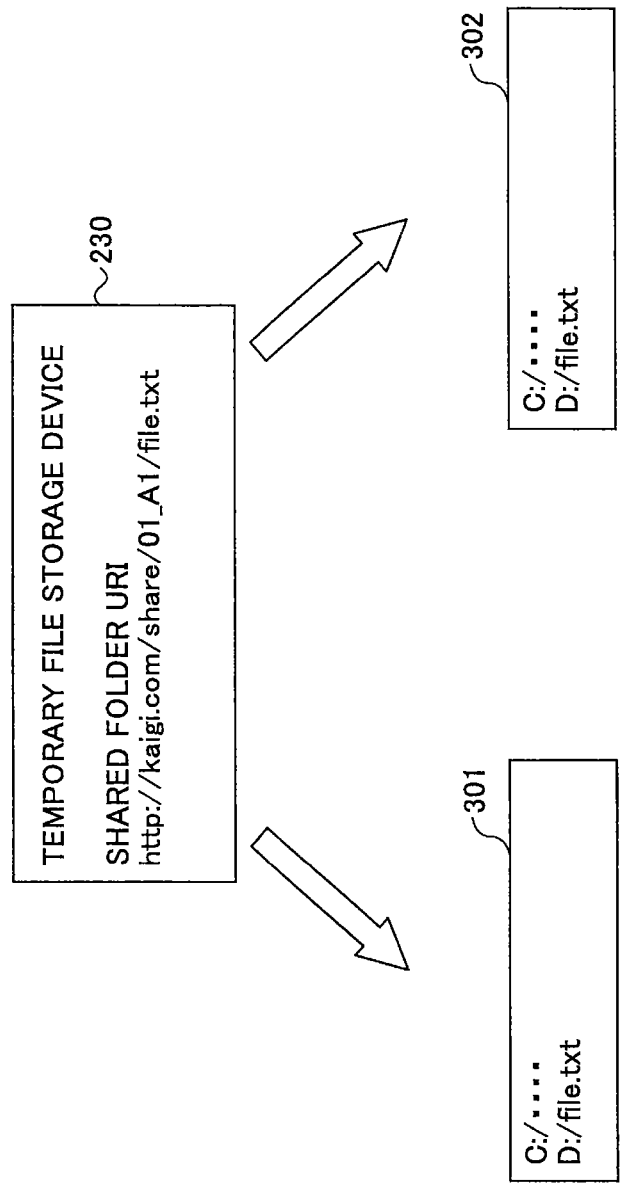

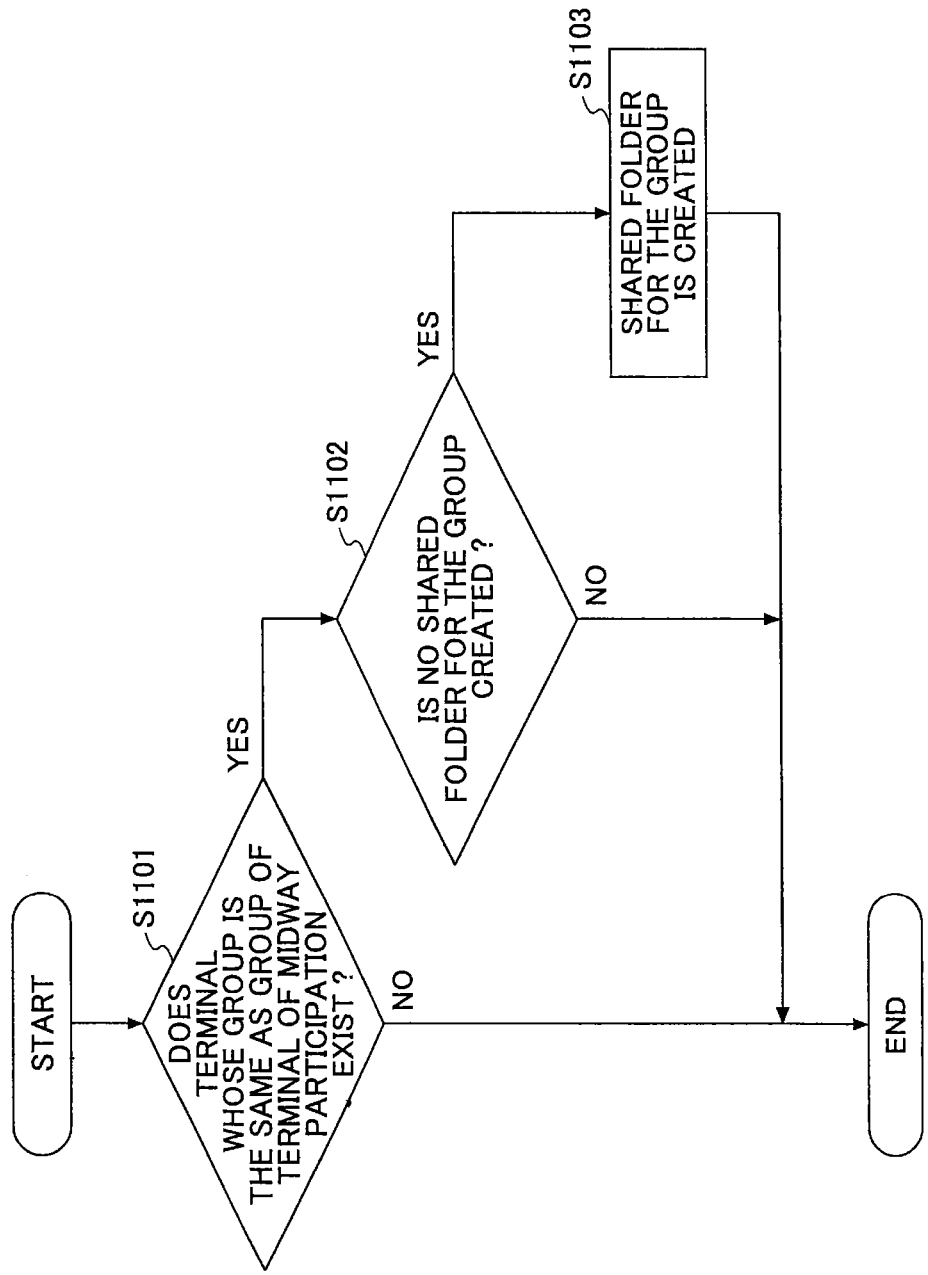

FIG.12A

| SESSION ID | TERMINAL ID | GROUP NAME | SHARED FOLDER URI | ACCOUNT NAME | PASSWORD |
|---|---|---|---|---|---|
| 01 | 0001, 0002, 0003 | ALL | http://kaigi.com/share/01_ALL | acc1 | 11111111 |
|  | 0001, 0002 | A1 | http://kaigi.com/share/01_A1 | acc2 | 22222222 |

| SESSION ID | TERMINAL ID | GROUP NAME | SHARED FOLDER URI | ACCOUNT NAME | PASSWORD |
|---|---|---|---|---|---|
| 01 | 0001, 0002, 0003, 0004 | ALL | http://kaigi.com/share/01_ALL | acc1 | 11111111 |
|  | 0001, 0002 | A1 | http://kaigi.com/share/01_A1 | acc2 | 22222222 |
|  | 0003, 0004 | A2 | http://a-intra.com/share/01_A2 | acc3 | 33333333 |

| GROUP NAME | DELETE OR NOT |
|---|---|
| A1 | DELETE |
| A2 | NOT DELETE |
| A3 | NOT DELETE |
| ... | ... |

| TERMINAL ID | NETWORK TYPE | GROUP NAME |
|---|---|---|
| 0001 | INTERNET | A1 |
| 0002 | INTERNET | A1 |
| 0003 | INTRANET-A | A2 |
| 0004 | INTRANET-A | A2 |
| 0005 | INTERNET | Z2 |
| 0006 | INTERNET | Z2 |
| ... | ... | ... |

FIG.17

| INTRANET ID | INTRANET URI |
|---|---|
| INTRANET-A | http://a-intra.com/ |
| INTRANET-B | http://b-intra.co.jp/ |
| ... | ... |

FIG.22

| TERMINAL ID | FIRST ATTRIBUTE NETWORK TYPE | SECOND ATTRIBUTE |
|---|---|---|
| USER-1 | OFFICE-a | SECTION-A |
| USER-2 | OFFICE-a | SECTION-A |
| USER-3 | OFFICE-b | SECTION-A |
| USER-4 | OFFICE-b | SECTION-B |
| USER-5 | OFFICE-c | SECTION-A |
| USER-6 | OFFICE-c | SECTION-B |
| ... | ... | ... |

FIG.24

| SETTING METHOD | FOLDER NAME |
|---|---|
| FIXED NAME | "ALL"<br>"FOLDER ACCESSIBLE FROM ALL TERMINALS"<br>"(USER-DEFINED)" |

FIG.25

| SETTING METHOD | FOLDER NAME |
|---|---|
| FIXED NAME | "GROUP NAME"<br>"ACCESS-RESTRICTED FOLDER"<br>"(USER-DEFINED)" |
| TERMINAL ID OF OTHER ACCESSIBLE TERMINAL (ACCESSIBLE TERMINAL ID) | "0004"<br>("0003, 0004") |
| TERMINAL NAME OF OTHER ACCESSIBLE TERMINAL (ACCESSIBLE TERMINAL NAME) | "A2 COMPANY, SALES SECT."<br>("A2 COMPANY, SALES SECT., A2 COMPANY, DEV. SECT.") |

| SESSION ID | TERMINAL ID | GROUP NAME | SHARED FOLDER URI | ACCOUNT NAME | PASSWORD | FOLDER NAME |
|---|---|---|---|---|---|---|
| 01 | 0001, 0002, 0003 | ALL | http://kaigi.com/share/01_ALL | acc1 | 11111111 | ALL |
| | 0001, 0002 | A1 | http://kaigi.com/share/01_A1 | acc2 | 22222222 | 001,002 |

| SESSION ID | TERMINAL ID | GROUP NAME | SHARED FOLDER URI | ACCOUNT NAME | PASSWORD | FOLDER NAME |
|---|---|---|---|---|---|---|
| 01 | 0001, 0002, 0003, 0004 | ALL | http://kaigi.com/share/01_ALL | acc1 | 11111111 | ALL |
| | 0001, 0002 | A1 | http://kaigi.com/share/01_A1 | acc2 | 22222222 | 001,002 |
| | 0003, 0004 | A2 | http://a-intra.com/share/01_A2 | acc3 | 33333333 | 003,004 |

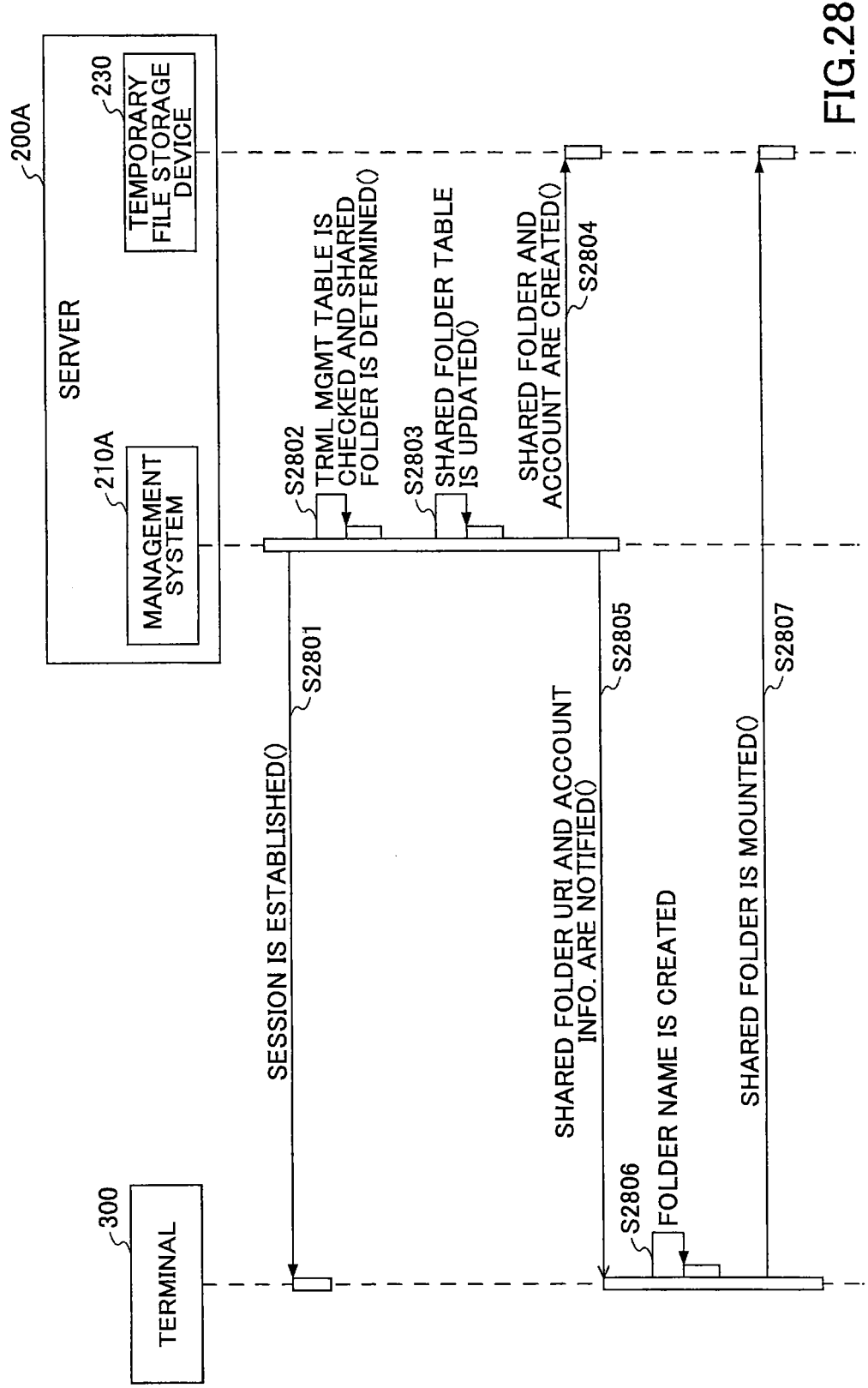

COMMUNICATION SERVER, COMMUNICATION SYSTEM, AND COMMUNICATION METHOD

BACKGROUND OF INVENTION

1. Field of the Invention

The present invention relates to a communication server connected to two or more terminals participating in a videoconference to manage communications between the terminals, and relates to a communication system including the communication server, and a communication method performed by the communication server.

2. Description of the Related Art

A videoconference system to conduct videoconferences between communication terminals at remote places via a network, such as the Internet, is becoming increasingly popular. In this videoconference system, a videoconference is conducted by exchanging video and audio data between the communication terminals.

A communication terminal in a conference room in which one of the attendants of the videoconference is present collects information including an image of the conference room and voice of the attendants, converts the collected information into digital image and voice data, and transmits the resulting image and voice data to a communication terminal of the other party in the videoconference system. In the other party's terminal, an image is displayed on a display of the other party's terminal and voice is output by a speaker of the other party's terminal. In the videoconference system according to the related art, a videoconference in appropriate conditions closely resembling reality may be conducted between the terminals at the remote places.

Further, in the related art, a communication terminal which transmits display data of a screen displayed on a computer to the other party's terminal via a relay device for a videoconference system, so that the screen is displayed on a display of the other party's terminal is also known.

For example, Japanese Laid-Open Patent Publication No. 2011-254453 discloses a communication terminal which transmits video data and display data of a screen shared with another communication terminal to the other communication terminal via a relay device. This communication terminal stores relay device information of the relay device to which the terminal transmits the display data, receives the display data from an external input device connected to the communication terminal, and transmits the received display data to the relay device indicated by the stored relay device information. Hence, the relay device transmits the display data to the other communication terminal, and the screen to be shared with the communication terminal is displayed on a display of the other communication terminal.

SUMMARY

In one embodiment, the present invention provides a communication server connected to a plurality of terminals participating in a videoconference to manage communications between the plurality of terminals, the communication server including: a checking unit configured to check a terminal management table which associates terminal identification data to identify each of the plurality of terminals with group identification data to identify each of groups to which the plurality of terminals belong respectively; a determination unit configured to determine whether group identification information of a first terminal in the plurality of terminals and group identification information of a second terminal in the plurality of terminals are a same as each other based on the group identification data; an updating unit configured to update a shared location table including shared location information indicating a location of a shared memory area shared by the same group when the group identification information of the first terminal and the group identification information of the second terminal are determined as being the same as each other; a memory access information creation unit configured to create memory access information for accessing the shared memory area to associate the shared memory area and the memory access information; and a notification unit configured to send a notification of the shared location information and the memory access information to the same group.

Other objects, features and advantages of the present invention will become more apparent from the following detailed description when read in conjunction with the accompanying drawings.

BRIEF DESCRIPTION OF DRAWINGS

FIG. 6 is a diagram showing an example of a terminal management table in the videoconference system according to the first embodiment.

FIG. 7 is a diagram showing an example of a shared folder table in the videoconference system according to the first embodiment.

FIG. 10 is a diagram for explaining mounting of a shared folder in the videoconference system according to the first embodiment.

FIG. 11 is a flowchart for explaining a process to determine a shared folder to be created when a terminal participates midway through a videoconference.

FIG. 12A and FIG. 12B are diagrams for explaining updating of the shared folder table.

FIG. 13 is a diagram showing an example of a table indicating that a group shared folder is to be deleted or not.

FIG. 16 is a diagram showing an example of a terminal management table in the videoconference system according to the second embodiment.

FIG. 17 is a diagram showing an example of a network management table in the videoconference system according to the second embodiment.

FIG. 22 is a diagram showing an example of a terminal management table in the videoconference system according to the third embodiment.

FIG. 24 is a diagram showing an example of a table associating a setting method and a folder name of a shared folder.

FIG. 25 is a diagram showing an example of a table associating a setting method and a folder name of a group shared folder.

FIGS. 27A and 27B are diagrams for explaining updating of the shared folder table in the videoconference server according to the fourth embodiment.

FIG. 28 is a sequence diagram for explaining operation of a videoconference server according to a fifth embodiment.

DESCRIPTION OF EMBODIMENTS

A description will be given of embodiments with reference to the accompanying drawings.

First Embodiment

Figure 1:
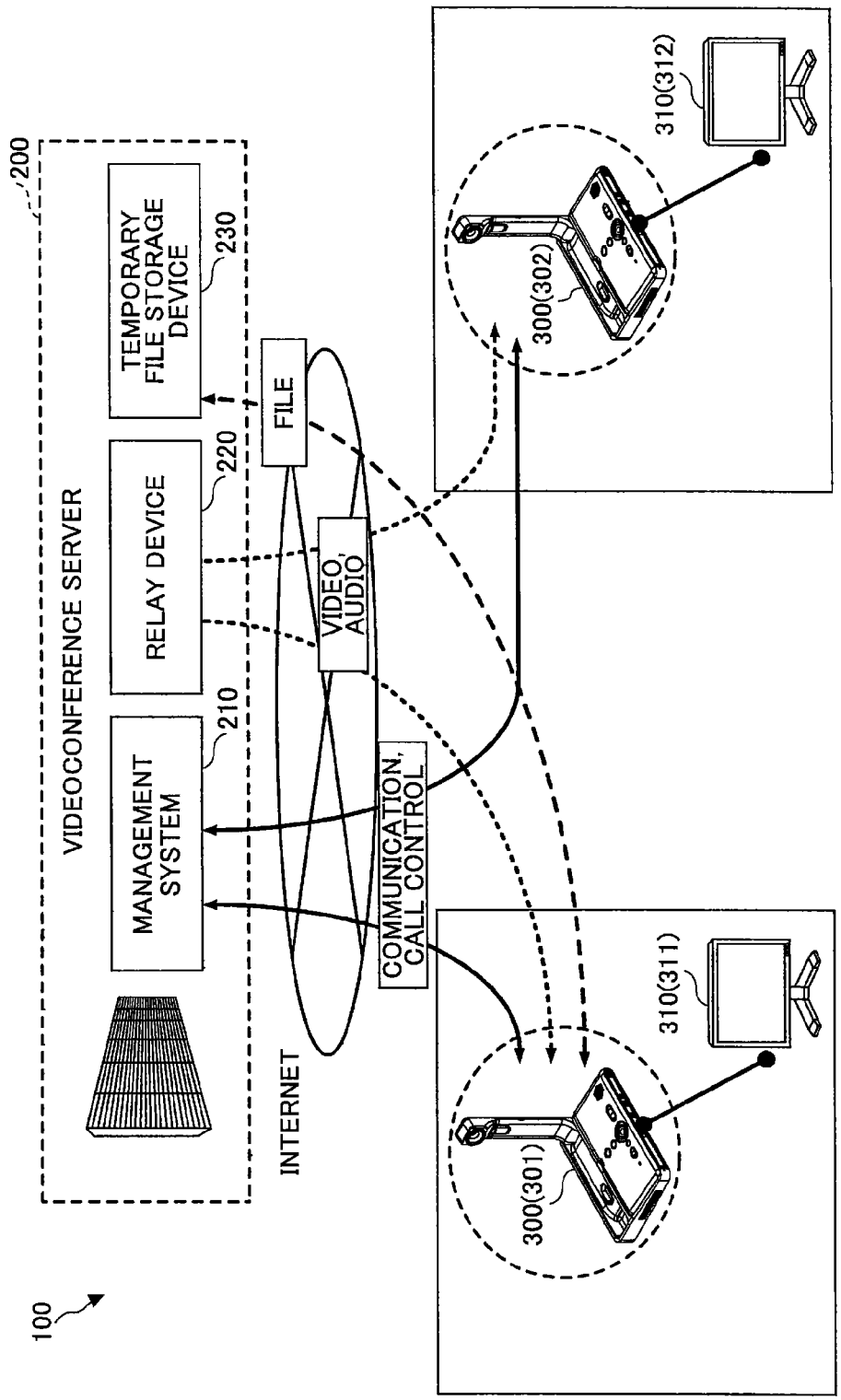
FIG. 1 is a diagram showing a composition of a videoconference system according to a first embodiment.

A videoconference system 100 according to a first embodiment is explained. FIG. 1 is a diagram showing a composition of the videoconference system 100 according to the first embodiment.

As shown in FIG. 1, the videoconference system 100 includes a videoconference server 200 and two or more sets of terminals 300 and PCs (personal computers) 310. The videoconference system 100 according to this embodiment is a communication system.

The videoconference server 200 in the videoconference system 100 according to the embodiment is a communication server, and each of the terminals 300 is a communication terminal. In the following, when distinguishing between each of the terminals 300 and the PCs 310 is needed, any one of the terminals 300 will be referred to as terminal 301, 302 . . . and any one of the PCs 310 will be referred to as PC 311, 312 . . . . On the other hand, when distinguishing between each of the terminals 300 and the PCs 310 is not needed, any one of the terminals 301, 302 . . . will be referred to as the terminal 300 and any one of the PCs 311, 312 . . . will be referred to as the PC 310.

In this embodiment, the videoconference server 200 includes a transmission management system (management system) 210, a relay device 220, and a temporary file storage device 230. The management system 210 provides a service to manage communications between the terminals 300 participating in a videoconference. For example, the management system 210 creates a session ID to identify a session when content data, including image (video) data and voice (audio) data, are transmitted and received between the terminals 300. By this session ID, the terminals 300 which share a file in the videoconference system 100 are identified.

The relay device 220 provides a service to relay transmission of image data and voice data in a relay path that is selected to allow the image data and the voice data to pass through an optimal path. In this embodiment, the relay device 220 monitors a delay time and optimizes a relay path, a resolution, etc., of the content data. The temporary file storage device 230 provides a service to share a file between the terminals participating in the videoconference.

As shown in FIG. 1, the management system 210, the relay device 220, and the temporary file storage device 230 in the videoconference server 200 are implemented by an information processing device, and the information processing device is referred to as the videoconference server 200. However, the present disclosure is not limited to this embodiment. The management system 210, the relay device 220, and the temporary file storage device 230 may be implemented by two or more separate information processing devices.

Figure 2:
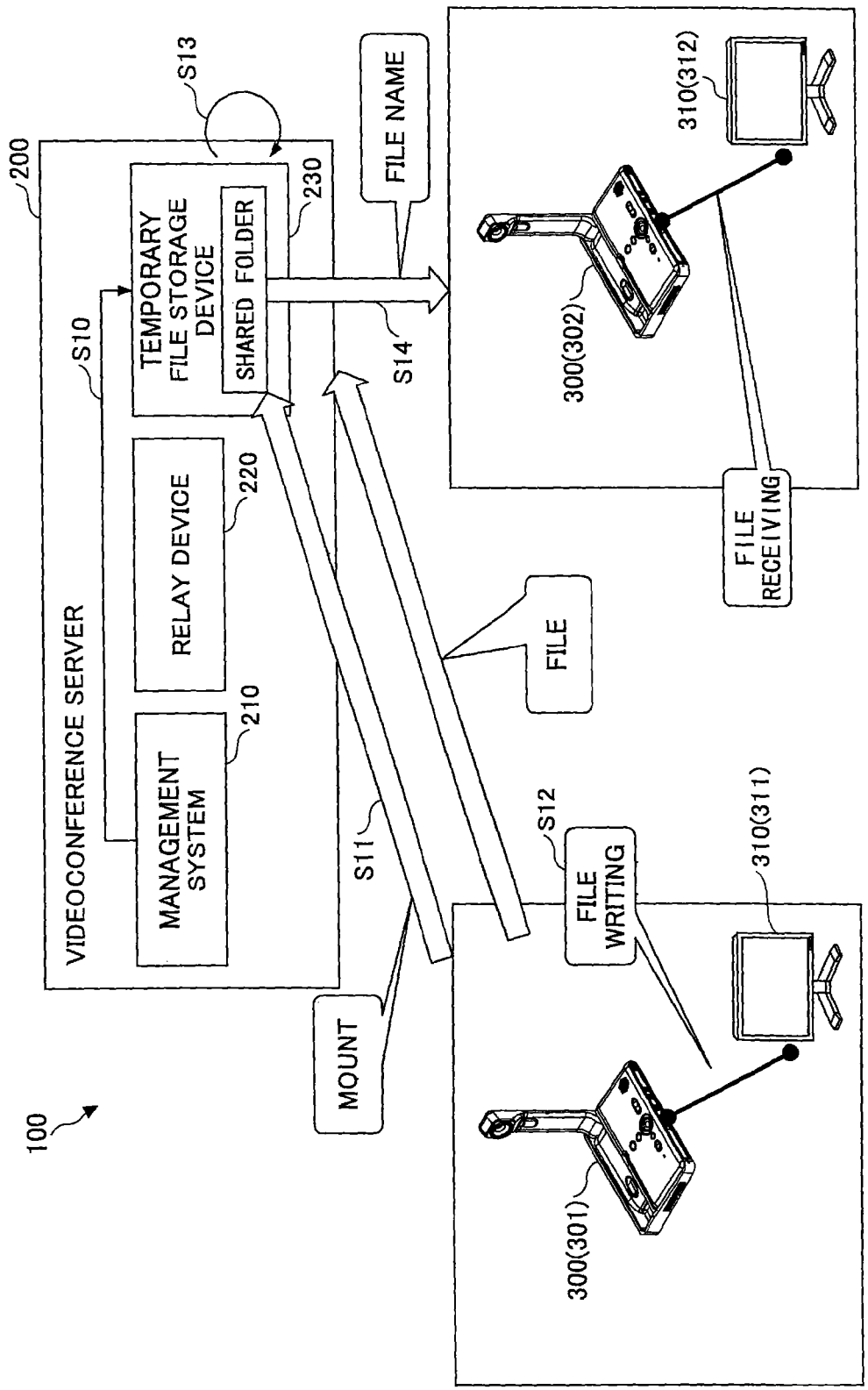
FIG. 2 is a diagram for explaining operation of the videoconference system according to the first embodiment.

Next, operation of the videoconference system 100 when the terminal 301 and the terminal 302 share a file in the PC 311 is explained with reference to FIG. 2. FIG. 2 is a diagram for explaining operation of the videoconference system 100 according to the first embodiment.

In the videoconference system 100 of this embodiment, when a videoconference starts, the management system 210 causes the temporary file storage device 230 to create a shared folder. The temporary file storage device 230 creates a shared folder that is shared by the terminals 300 participating in the videoconference, and sends a notification of a shared folder URI (uniform resource identifier) and account information (which will be described later) to the terminals 301 and 302 (step S10).

Subsequently, the terminals 301 and 302 mount the shared folder to the shared folder URI using the account information (step S11). In the following, mounting a shared folder is to allow the terminals 301 and 302 to use the shared folder in the temporary file storage device 230 like a folder in the terminals 301 and 302.

In the videoconference system 100 of this embodiment, for example, when the PC 311 writes a file in the terminal 301, the terminal 301 detects the writing of the file by the PC 311 and transmits the file to the temporary file storage device 230 (step S12). At this time, the file is not left in the terminal 301 after it is transmitted to the temporary file storage device 230.

Subsequently, the temporary file storage device 230 stores the file in the shared folder (step S13). Then, the temporary file storage device 230 transmits a file name stored in the shared folder to the terminal 302 having mounted the shared folder (step S14). In this embodiment, the content of the file is not transmitted from the temporary file storage device 230 to the terminal 302 until an explicit file transmission request is received. A user of the PC 312 views the file name and if the user finds it necessary to receive the file, the user may request the temporary file storage device 230 to transmit the file to the terminal 302.

In this embodiment, if a request for file transmission is input by the user, the PC 312 may receive the content of the file from the shared folder via the terminal 302, and display the file on a display of the PC 312.

As described above, in the videoconference system 100 of this embodiment, if only the PC 311 writes a file in the terminal 301, the file may be shared by the terminal 301 and the terminal 302.

In the videoconference system 100 according to this embodiment, services which are separate from the service of the relay device 220 to transmit content data are configured to share a file, the file may be shared by the terminals 300 without affecting the transmission/reception of the content data. Further, the temporary file storage device 230 manages the file by associating the file with the session ID. Hence, the temporary file storage device 230 may manage sharing of the file between the terminals 300 as a service that is different from a service provided by the management system 210.

Figure 3:
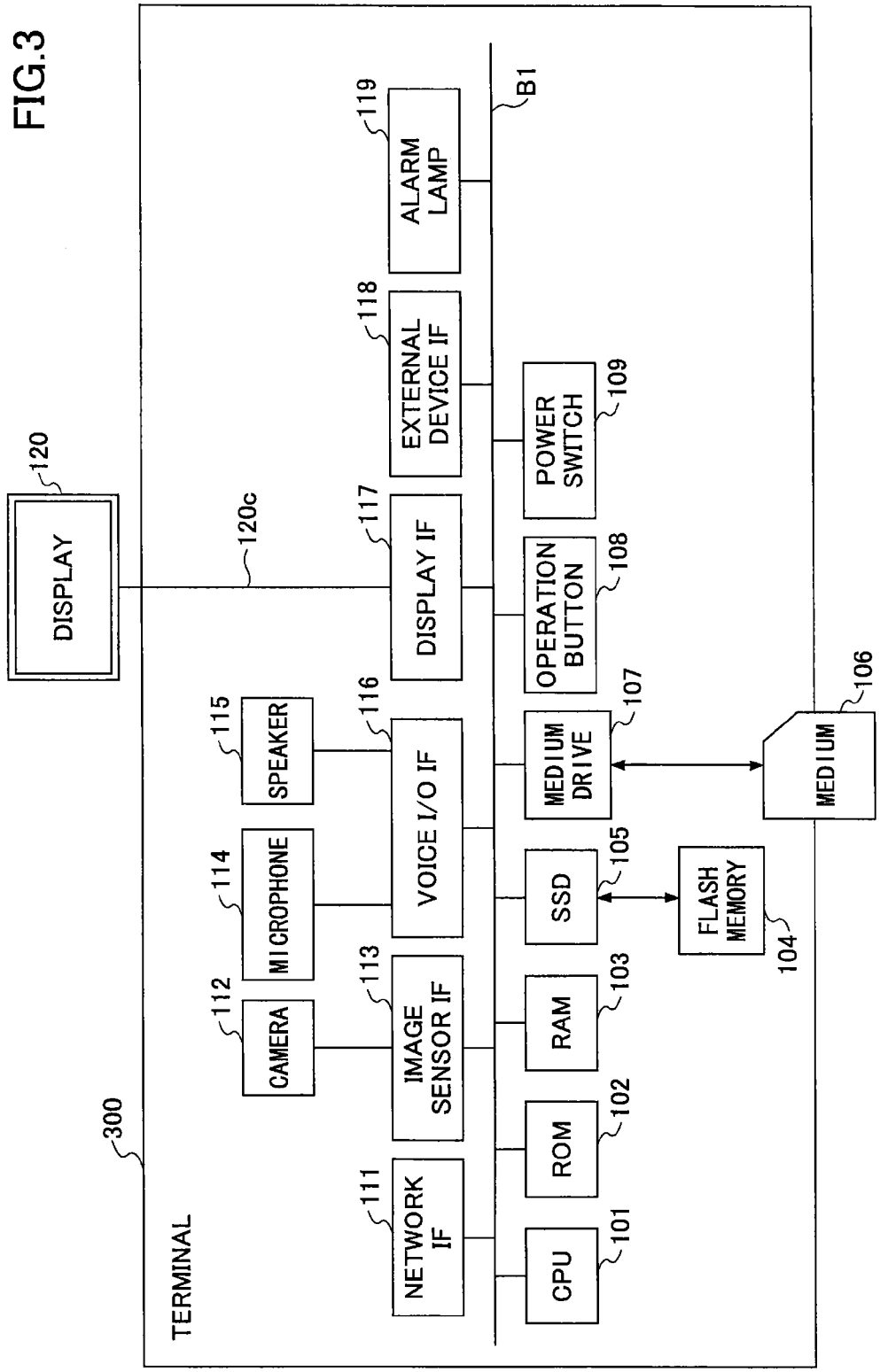
FIG. 3 is a block diagram showing a hardware configuration of a communication terminal.

Next, the terminal 300 of this embodiment is explained with reference to FIG. 3. FIG. 3 is a diagram showing a hardware configuration of a communication terminal 300 in the videoconference system according to the first embodiment.

As shown in FIG. 3, the terminal 300 includes a central processing unit (CPU) 101 configured to control overall operations of the terminal 300, a read-only memory (ROM) 102 storing programs for the terminal, a random access memory (RAM) 103 utilized as a work area of the CPU 101, a flash memory 104 configured to store various data, such as image data or audio data, a solid state drive (SSD) 105 configured to control retrieval and writing of the various data in the flash memory 104 based on the control of the CPU 101, a medium drive 107 configured to control retrieval or writing (storing) of data into a recording medium 106, such as a flash memory, an operation button 108 operated by a user when selecting an address of the terminal 300, a power switch 109 for switching ON/OFF of the power of the terminal 300, and a network interface (IF) 111 for transmitting data utilizing a communication network.

The terminal 300 further includes a built-in camera 112 configured to create an image of a subject based on the control of the CPU 101, an image sensor interface (IF) 113 configured to control driving of the camera 112, a built-in microphone 114 configured to pick up audio, such as voice, sound or noise, a built-in speaker 115 configured to output audio, a voice input/output (I/O) interface (IF) 116 configured to provide an interface for the inputting/outputting of the audio from the microphone 114 and to the speaker 115, and a display interface (IF) 117 configured to transmit image data to an external display 120 based on the control of the CPU 101. The terminal 300 further includes an external device IF 118 configured to connect various external devices to the connecting ports, an alarm lamp 119 configured to inform the user of various functional problems of the terminal 300, a display 120, and a bus line B1 such as an address bus and a data bus for electrically connecting the elements and devices with one another shown in FIG. 3 via the bus line B1.

The display 120 is a display unit formed of liquid crystal or an organic EL (electroluminescence) material and configured to display images of the subject or icons for operating the terminal 300. Further, the display 120 is connected to the display interface 117 via a cable 120c. The cable 120c may be an analog RGB (VGA) cable signals, a component video cable, a high-definition multimedia interface (HDMI) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device interface 118 may be connected via a universal serial bus (USB) cable with external devices, such as an external camera, an external microphone, and an external speaker. When connecting the external camera to the external device interface 118 via the USB, the external camera is driven in priority to the built-in camera 112. Likewise, when connecting the external microphone or the external speaker to the external device interface 118 via the USB, the external microphone or the external speaker is driven in priority to the built-in microphone 114 or the built-in speaker 115.

Note that the recording medium 106 is removable from the terminal 300. In addition, if the recording medium 106 is a non-volatile memory configured to retrieve or write data based on the control of the CPU 101, the recording medium 106 is not limited to the flash memory 104, and may be an electrically erasable and programmable ROM (EEPROM).

Further, the above-described programs for the terminal may be recorded in an installable format or in an executable format on a computer-readable recording medium such as the recording medium 106 to distribute such a recording medium. Further, the above-described programs for the terminal may be recorded on the ROM 102 instead of the flash memory 104.

Figure 4:
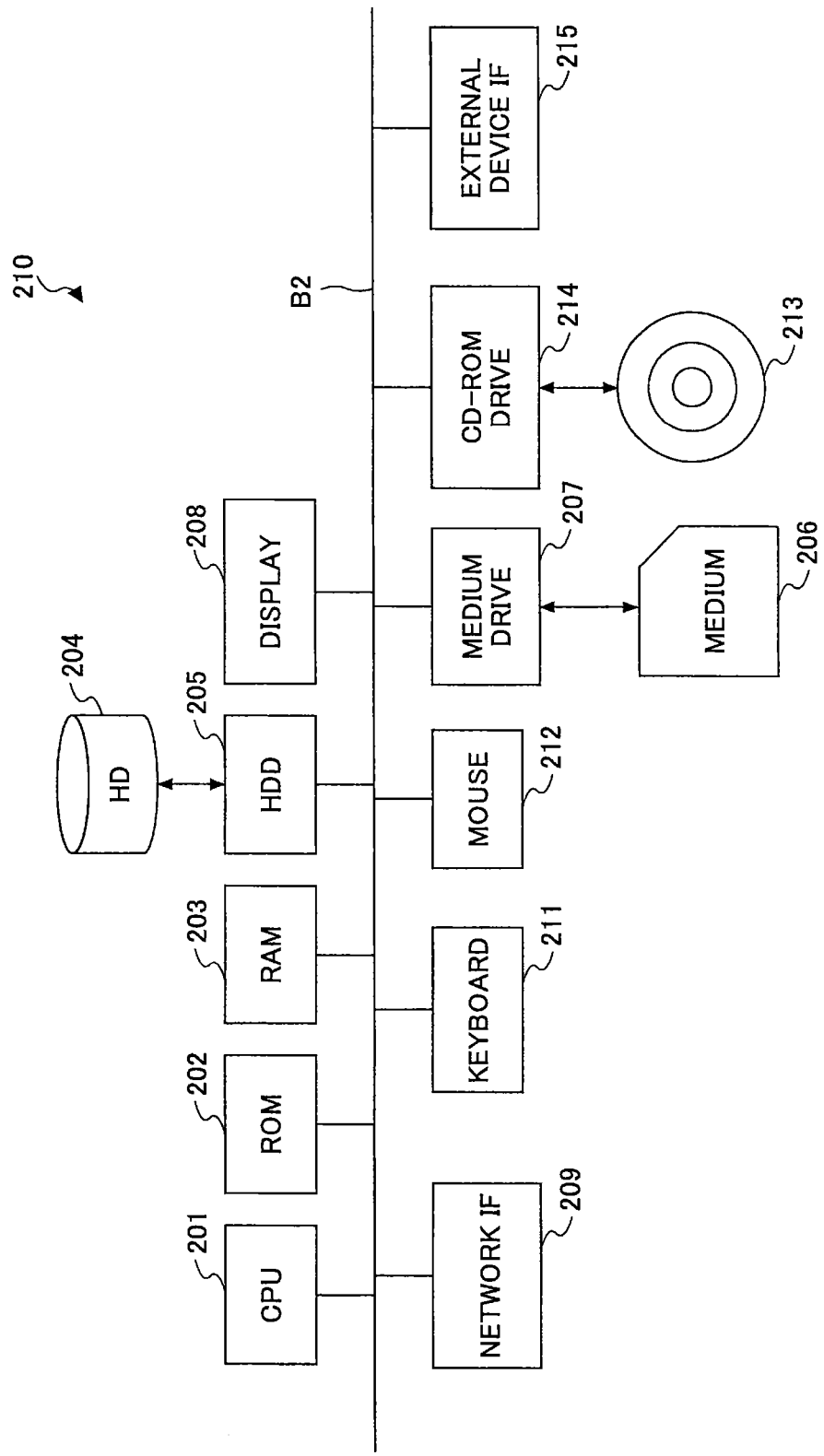
FIG. 4 is a block diagram showing a hardware configuration of a management system.

Next, the management system 210 of this embodiment is explained with reference to FIG. 4. FIG. 4 is a diagram showing a hardware configuration of a transmission management system 210 in the videoconference system according to the first embodiment.

As shown in FIG. 4, the management system 210 includes a CPU 201 configured to control overall operations of the management system 210, a ROM 202 storing programs for the management system, a RAM 203 utilized as a work area of the CPU 201, a hard disk (HD) 204 configured to store various data, a hard disk drive (HDD) 205 configured to control retrieval or writing of the various data to the HD 204 based on the control of the CPU 201, a medium drive 207 configured to control retrieval or writing (storing) of data into a recording medium 206 such as a flash memory, a display 208 configured to display various information such as a cursor, menus, windows, characters, and images, a network IF 209 for transmitting data utilizing a communication network, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, and a bus line B2 such as an address bus and a data bus for electrically connecting the elements and devices with one another shown in FIG. 4 via the bus line B2.

Note that the above-described programs for the management system may be recorded in an installable format or in an executable format on a computer-readable recording medium such as the recording medium 206 or the CD-ROM 213 to distribute such a recording medium.

Further, the relay device 220 of this embodiment includes a hardware configuration similar to that of the management system 210, and a description of the hardware configuration of the relay device 220 is therefore omitted. Note that the ROM 202 stores programs for controlling the relay device 220. In this case, the programs for the relay device may be recorded in an installable format or in an executable format on a computer-readable recording medium such as the recording medium 206 or the CD-ROM 213 to distribute such a recording medium.

In this embodiment, in a case where the terminals 300 are divided into plural groups, the videoconference system 100 is configured so that relevant files may be shared by the terminals 300 belonging to a same group. Specifically, in this embodiment, a shared folder to be shared by the terminals 300 same group is associated with the terminals 300 same group.

Next, association between the terminals 300 same group and a shared folder is explained with reference to FIG. 5. FIG.

5 is a diagram for explaining association between terminals and shared folders in the videoconference system 100 according to the first embodiment.

Figure 5:
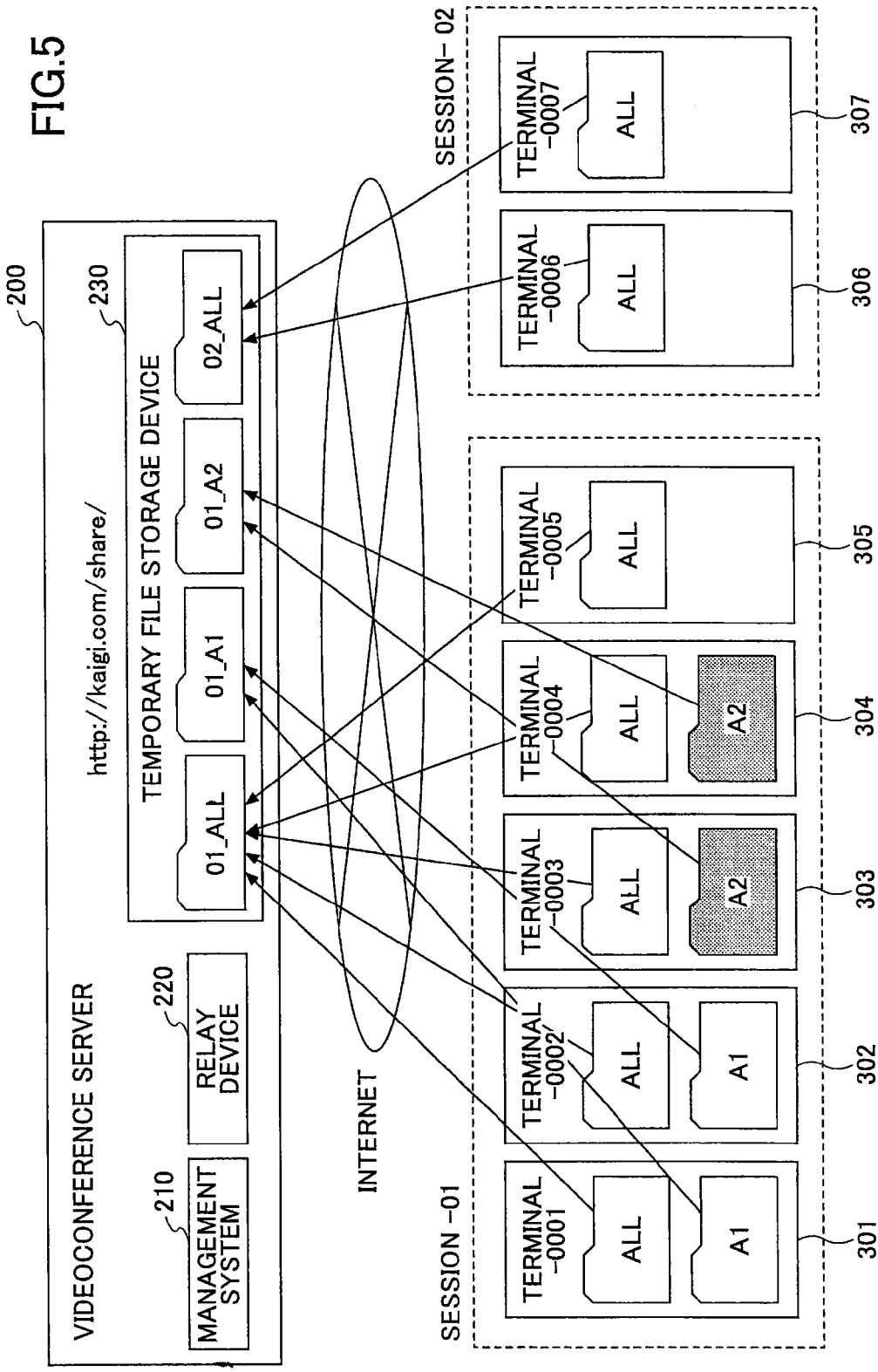
FIG. 5 is a diagram for explaining association between terminals and shared folders in the videoconference system according to the first embodiment.

In FIG. 5, a case in which terminals 301-305 participate in a videoconference of session ID (conference ID) 01, and terminals 306 and 307 participate in a videoconference of session ID 02 is illustrated.

In this case, the management system 210 in the videoconference server 200 causes the temporary file storage device 230 to create a shared folder 01_ALL which is shared by all the terminals 301-305 participating in the videoconference of session ID 01. Further, the management system 210 in the videoconference server 200 causes the temporary file storage device 230 to create a shared folder 02_ALL which is shared by the terminals 306 and 307 participating in the videoconference of session ID 02.

In the example of FIG. 5, two additional groups are formed for the terminals 301-304. Specifically, the terminals 301 and 302 belong to group A1, and the terminals 303 and 304 belong to group A2.

The videoconference server 200 of this embodiment is configured so that the management system 210 causes the temporary file storage device 230 to create a shared folder associated with each of the groups. Specifically, the videoconference server 200 of this embodiment creates a shared folder 01_A1 shared by only the terminals 301 and 302 belonging to group A1. Similarly, the videoconference server 200 of this embodiment creates a shared folder 01_A2 shared by only the terminals 303 and 304 belonging to group A2.

In this embodiment, when the terminals 300 participating in the same session (conference) are divided into plural groups, a shared folder to be shared by only the terminals 300 belonging to each of the groups is created. Thereby, in the videoconference system 100 according to the embodiment, relevant files may be shared between the terminals 300 participating in the same session, while maintaining security, and the management regarding sharing of the files may be performed appropriately.

In this embodiment, grouping of the terminals 300 may be performed based on an identifier of each terminal 300 assigned beforehand to the terminal 300. Alternatively, grouping of the terminals 300 may be performed based on information of each terminal 300 assigned beforehand to the terminal 300.

In this embodiment, the shared folder which is created by the temporary file storage device 230 is a storage region shared by the terminals 300 same group. In this embodiment, this storage region is referred to as a shared folder. However, this storage region is not limited to a shared folder. For example, the storage region shared by the terminals 300 same group may be referred to as a directory. Further, relevant files may be stored in the storage region.

Next, creation and association of a shared folder for each group by the management system 210 is explained. In the following, the shared folder for each group is referred to as a group shared folder.

The management system 210 of this embodiment includes a terminal management table which is used to manage the terminals 300, and a shared folder table which is used to store information in the shared folder associated with the terminals 300.

FIG. 6 is a diagram showing an example of a terminal management table 60 in the videoconference system 100 according to the first embodiment.

As shown in FIG. 6, in the terminal management table 60, a terminal ID which identifies each of the terminals 300 is associated with a name of a group which the terminal 300 belongs to. For example, the terminal management table 60 of this embodiment may be stored in the ROM 202 or the RAM 203 as the storage region of the management system 210.

In the terminal management table 60, the terminal ID is associated with the name of the group which the terminal 300 belongs to. However, the present disclosure is not limited to this embodiment. For example, information associated with the terminal ID may be information that identifies the group which the terminal 300 belongs to. Namely, when the terminals 300 are divided into groups, group identification information which identifies a group which each terminal 300 belongs to is assigned. The group name in the terminal management table 60 may be the group identification information.

FIG. 7 is a diagram showing an example of a shared folder table 70 in the videoconference system 100 according to the first embodiment. As shown in FIG. 7, in the shared folder table 70, a session ID is associated with a terminal ID, a group name, a shared folder URI (uniform resource locator), an account name, and a password.

The session ID may be automatically assigned by the management system 210 each time a videoconference is held, for example. The terminal ID and the group name are assigned as described above with reference to FIG. 6. The shared folder URI is information which identifies a shared folder created by the temporary file storage device 230. In this embodiment, the URL indicating a location of the shared folder is referred to as the shared folder URI.

The account name and the password is account information which the terminals 300 are notified with the shared folder together with the shared folder URI. For example, the account information may be predetermined at a time of creation of the shared folder. The shared folder URI and the account information are hidden from a user, and they may be converted into illegible character strings, such as hash values.

In the embodiment, the terminal management table 60 is stored beforehand in the management system 210. However, the present disclosure is not limited to this embodiment. For example, when the management system 210 and the terminal 300 are connected, the management system 210 may create the terminal management table 60 by reading information from the terminal 300.

The management system 210 of this embodiment is configured to perform association between the terminals 300 and the group shared folder by using the terminal management table 60 and the shared folder table 70.

Figure 8:
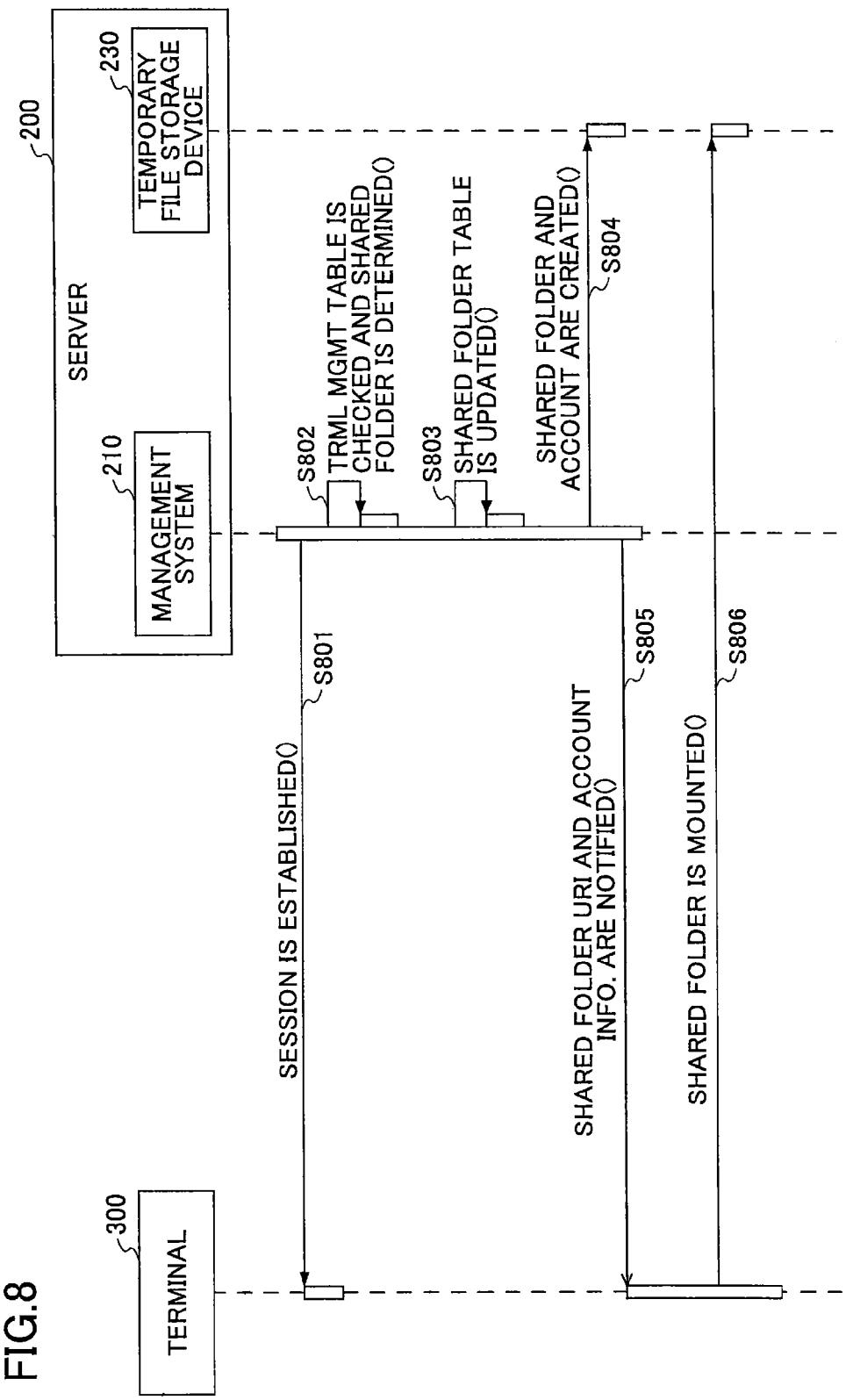
FIG. 8 is a sequence diagram for explaining operation of a videoconference server according to the first embodiment.

Next, operation of the videoconference system 100 according to the first embodiment to exchange information between the videoconference server 200 and the terminal 300 is explained with reference to FIG. 8. FIG. 8 is a sequence diagram for explaining the operation of the videoconference server 100 according to the first embodiment.

When starting a videoconference in the videoconference system 100, the management system 210 of the videoconference server 200 establishes a session with the terminal 300 which participates in the videoconference (step S801). Subsequently, the management system 210 checks the terminal management table 60 and determines a group shared folder to be created (step S802). A detailed process of step S802 will be described later.

After the group shared folder to be created is determined in step S802, the management system 210 updates the shared folder table 70 (step S803). Subsequently, the management system 210 creates account information of the group shared folder and the group shared folder in the temporary file storage device 230 (step S804). In this embodiment, in step S804, a shared folder which is shared by all the terminals 300 participating in the same conference may be created in the temporary file storage device 230 in addition to the group shared folder.

Subsequently, the management system 210 checks the shared folder table 70 and the terminal 300 is notified of the shared folder URI of the shared folder, the shared folder URI of the group shared folder, and the account information for accessing the shared folder (step S805). Subsequently, the terminal 300 mounts the shared folder and the group shared folder in the temporary file storage device 230 (step S806). Mounting of the shared folder will be described later.

In the above embodiment, the shared folder which is shared by all the terminals 300 participating in the same videoconference is created in addition to the group shared folder. However, the present disclosure is not limited to this embodiment. Only the group shared folder may be created without creating the shared folder.

In the above embodiment, after the shared folder table 70 is updated in step S803, the corresponding shared folder is created in step S804. Alternatively, a reverse process of step S804 and step S803 may be performed. Namely, after the shared folder and the group shared folder are created by the temporary file storage device 230, the shared folder table 70 may be updated.

Figure 9:
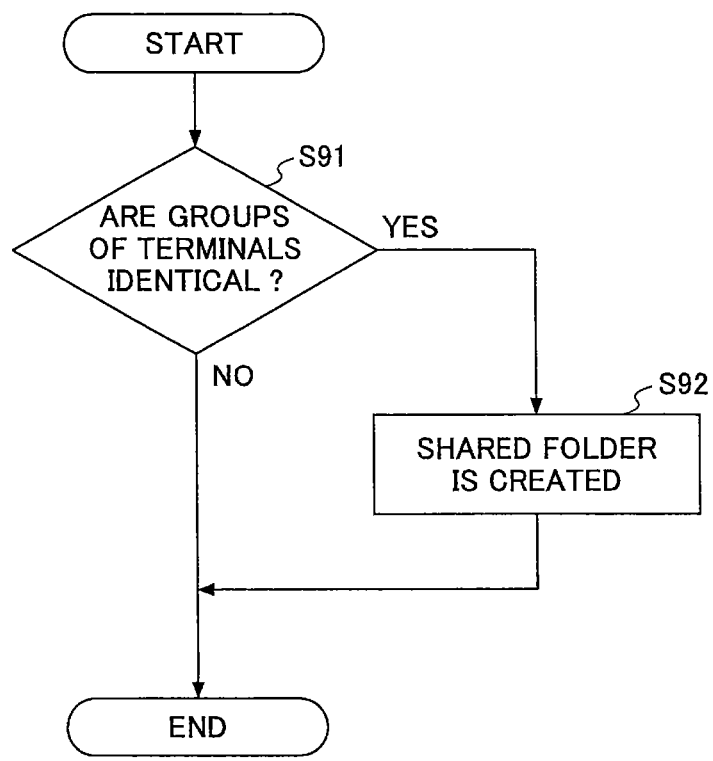
FIG. 9 is a flowchart for explaining a process to determine a shared folder to be created in the videoconference system according to the first embodiment.

Next, a detailed process of step S802 is explained with reference to FIG. 9. FIG. 9 is a flowchart for explaining a process to determine a shared folder to be created in the videoconference system 100 according to the first embodiment.

It is assumed that plural terminals 300 are connected to the videoconference server 200 upon a start of the videoconference. The management system 210 checks the terminal management table 60 and determines whether a terminal 300 belonging to a group identical to a group of the terminal 300 newly participating in the videoconference exists among the plural terminals 300 (step S91).

When the terminal 300 is determined as belonging to the group in step S91, the group shared folder to be created by the temporary file storage device 230 is determined (step S92) and the process of step S802 is completed. When the terminal 300 is determined as not belonging to the group in step S91, the process of step S802 is completed without determining the group shared folder to be created.

Referring back to FIGS. 5 and 6, a concrete example is explained in order to facilitate the understanding of the process shown in FIG. 9. Suppose a case in which the terminal 302 is newly connected to the videoconference server 200 to participate in the videoconference of session ID 01. It is assumed that the session between the terminal 301 and the videoconference server 200 is already established at this time.

In this case, the management system 210 checks the terminal management table 60 and receives a terminal ID 0002 of the terminal 302 and a group name associated with the terminal ID of the terminal 302. In this example, the group name of the terminal 302 is A1 as shown in FIG. 6. Subsequently, the management system 210 determines whether a terminal 300 belonging to group A1 (identical to the group of the terminal 302 newly participating in the videoconference) exists among the terminals 300 already participating in the videoconference of session ID 01. In this example, the terminal 301 is determined as belonging to group A1 and already participating in the videoconference.

Therefore, in the above case, the management system 210 causes the temporary file storage device 230 to create a group shared folder which is shared by the group-A1 terminals 300. Then, the management system 210 sends a notification of the shared folder URI and the account information of the created group shared folder to the terminals 301 and 302 belonging to group A1.

Next, mounting of a shared folder is explained with reference to FIG. 10. FIG. 10 is a diagram for explaining mounting of a shared folder in the videoconference system 100 according to the first embodiment.

Suppose that the shared folder URI of the temporary file storage device 230 is represented by "http://kaigi.com/share/01_A1". The terminals 301 and 302 designate this shared folder URI and mount the group shared folder, and the group shared folder is mounted on the terminals 301 and 302. For example, if the terminals 301 and 302 designate a D drive of each terminal as a mounting destination, the group shared folder is mounted on each of the D drives of the terminals 301 and 302.

For example, when a file "file.txt" is stored in the group shared folder of the temporary file storage device 230, a file name of "file.txt" on the corresponding D drive of the terminals 301 and 302 is displayed. In this case, the substance of the file is stored in the group shared folder of the temporary file storage device 230.

Next, a case in which the terminal 300 participates midway through a videoconference in the videoconference system 100 according to the first embodiment is explained. A process performed by the videoconference system 100 when the terminal 300 participates midway through the videoconference is essentially the same as that shown in FIG. 8 except the process of step S802. When creation of a group shared folder is not needed, the management system 210 performs only the updating of the shared folder table 70 in step S803.

The process performed by the videoconference system 100 when the terminal 300 participates midway through the videoconference is explained. FIG. 11 is a flowchart for explaining a process to determine a shared folder to be created when the terminal 300 participates midway through the videoconference in the videoconference system 100 according to the first embodiment.

After a session between the terminal 300 participating midway through the videoconference and the videoconference server 200 is established in the videoconference system 100, the management system 210 determines whether a terminal 300 whose group is the same as the group of the terminal 300 of midway participation exists among the terminals 300 already participating in the videoconference (step S1101). Specifically, the management system 210 checks the terminal management table 60 and the shared folder table 70 and determines whether a terminal 300 whose group is the same as the group of the terminal 300 of midway participation exists among the terminals 300 already participating in the videoconference.

When the terminal's same group is determined as not existing in step S1101, the management system 210 terminates the process of FIG. 11. When the terminal's same group is determined as existing in step S1101, the management system 210 determines whether a group shared folder associated with the group of the terminal 300 of midway participation is not yet created by the temporary file storage device 230 (step S1102).

When the corresponding group shared folder is already created by the temporary file storage device 230 in step S1102, the management system 210 terminates the process of FIG. 11. When no corresponding group shared folder is created by the temporary file storage device 230 in step S1102, the management system 210 creates the corresponding group shared folder (step S1103) and terminates the process of FIG. 11.

Next, updating of the shared folder table 70 when a terminal 300 participates midway through the videoconference is explained with reference to FIGS. 12A and 12B. FIGS. 12A and 12B are diagrams for explaining updating of the shared folder table.

In the example of FIGS. 12A and 12B, it is assumed that the terminal 304 participates midway through the videoconference of session ID 01 in which the terminals 301-303 are participating. FIG. 12A shows a state of the shared folder table 70A before updating, and FIG. 12B shows a state of the shared folder table 70B after updating.

In the shared folder table 70A shown in FIG. 12A, among the terminals 300 participating in the videoconference of session ID 01, the terminal 301 and the terminal 302 belong to group A1. Therefore, a shared folder shared by all the terminals 300 participating in the videoconference of session ID 01, and a group shared folder associated with group A1 are created in the temporary file storage device 230.

When the terminal 304 participates midway through the videoconference of session ID 01, the management system 210 checks the terminal management table 60 and detects the group which the terminal 304 belongs to. As shown in FIG. 12B, the terminal 304 belongs to group A2. Therefore, the management system 210 determines whether a terminal which belongs to group A2 exists among the terminals 301-303 participating in the videoconference. In the shared folder table 70B shown in FIG. 12B, the terminal 303 belongs to group A2. Therefore, the management system 210 creates a group shared folder associated with group A2 and updates the shared folder table 70A, thereby resulting in the shared folder table 70B.

Accordingly, even when the terminal 300 participates midway through the videoconference, the sharing of data between the terminals including the terminal 300 of midway participation may be controlled appropriately.

In the above embodiment, the shared folder and the group shared folder created by the temporary file storage device 230 may be deleted after the videoconference is completed, or may be left in the temporary file storage device 230 without change.

FIG. 13 is a diagram showing an example of a table 80 indicating that a group shared folder is to be deleted or not. For example, in the management system 210 of this embodiment, the table 80 shown in FIG. 13 may be stored beforehand in the ROM 202 or the RAM 203.

It is assumed that, when the videoconference of session ID 01 is completed, group shared folders associated with group A1 and group A2 have been created by the temporary file storage device 230. In this case, the management system 210 checks the table 80, deletes the group shared folder associated with group A1, and leaves the group shared folder associated with group A2 in the temporary file storage device 230 in accordance with the content of the table 80. Deleting a shared folder is to return the shared folder state of the storage region in the temporary file storage device 230 back to a normal storage region state.

Second Embodiment

Next, a videoconference system 100A according to a second embodiment is explained. The videoconference system 100A is essentially the same as the videoconference system 100 according to the first embodiment except that a group shared folder is created by a device other than videoconference server 200. In the following, only the points of the second embodiment differing from the first embodiment will be described. The elements and devices of the videoconference system 100A which are essentially the same as corresponding elements and devices of the video conference system 100 are designated by the same reference numerals, and a description thereof will be omitted.

Figure 14:
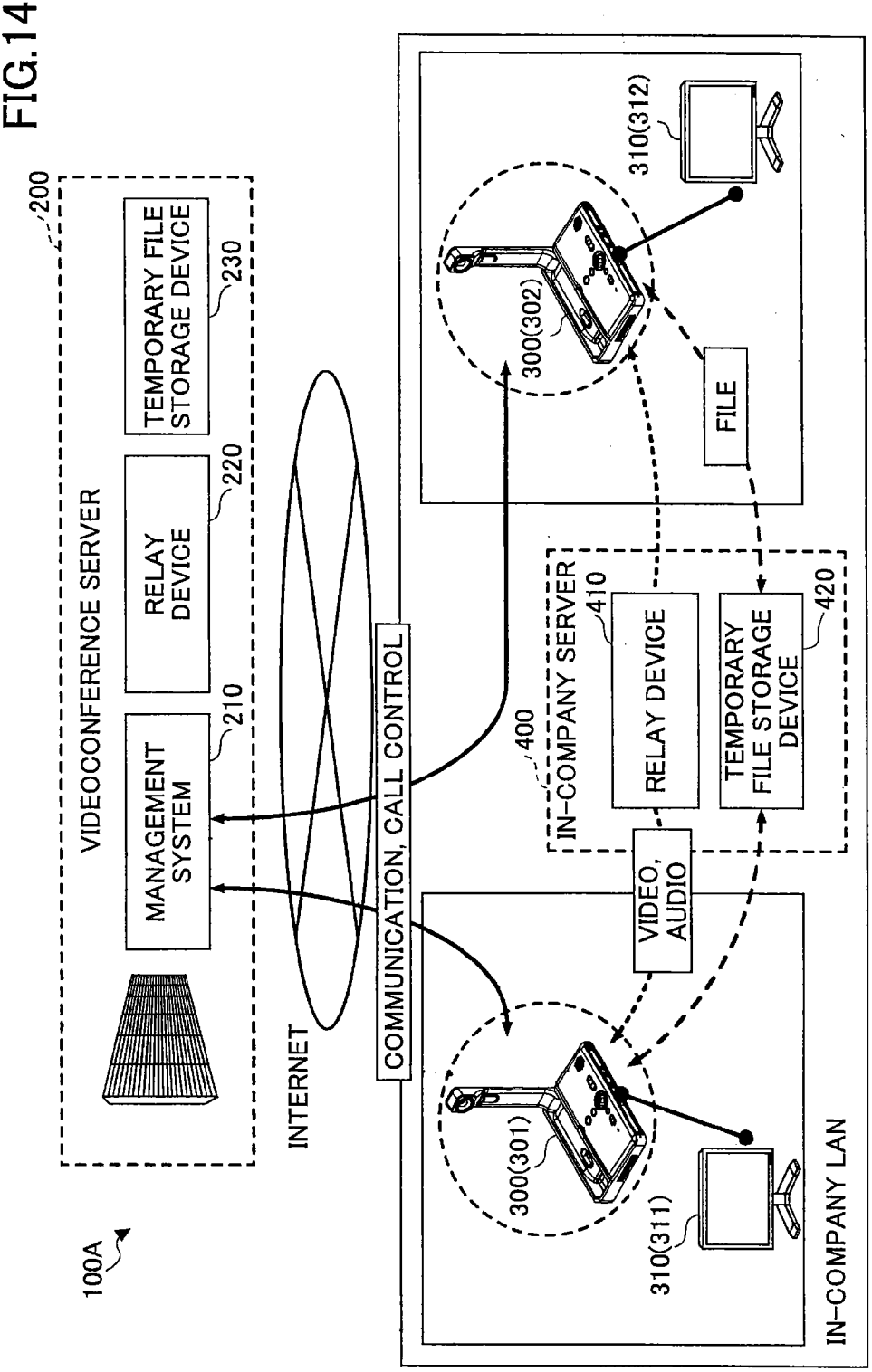
FIG. 14 is a diagram showing a composition of a videoconference system according to a second embodiment.

FIG. 14 is a diagram showing a composition of the videoconference system 100A according to the second embodiment. In the videoconference system 100A, the terminal 301 and the terminal 302 are interconnected by an intranet such as an in-company LAN (local area network). An in-company server 400 is arranged in a company, and a relay device 410 and a temporary file storage device 420 are arranged in the in-company server 400. Note that the in-company server 400 may be an external server linked by a secure circuit, such as VPN (virtual private network), and it is not necessary to physically arrange the in-company server 400 in the company.

In the videoconference system 100A shown in FIG. 14, the terminals 301 and 302 may utilize a video and audio router in the private network (the intranet) as a relay device to carry out a videoconference between the terminals 301 and 302 without transmitting video and audio data outside. Therefore, in this case, the temporary file storage device 430 arranged in the in-company LAN may improve the security at the time of file sharing.

Figure 15:
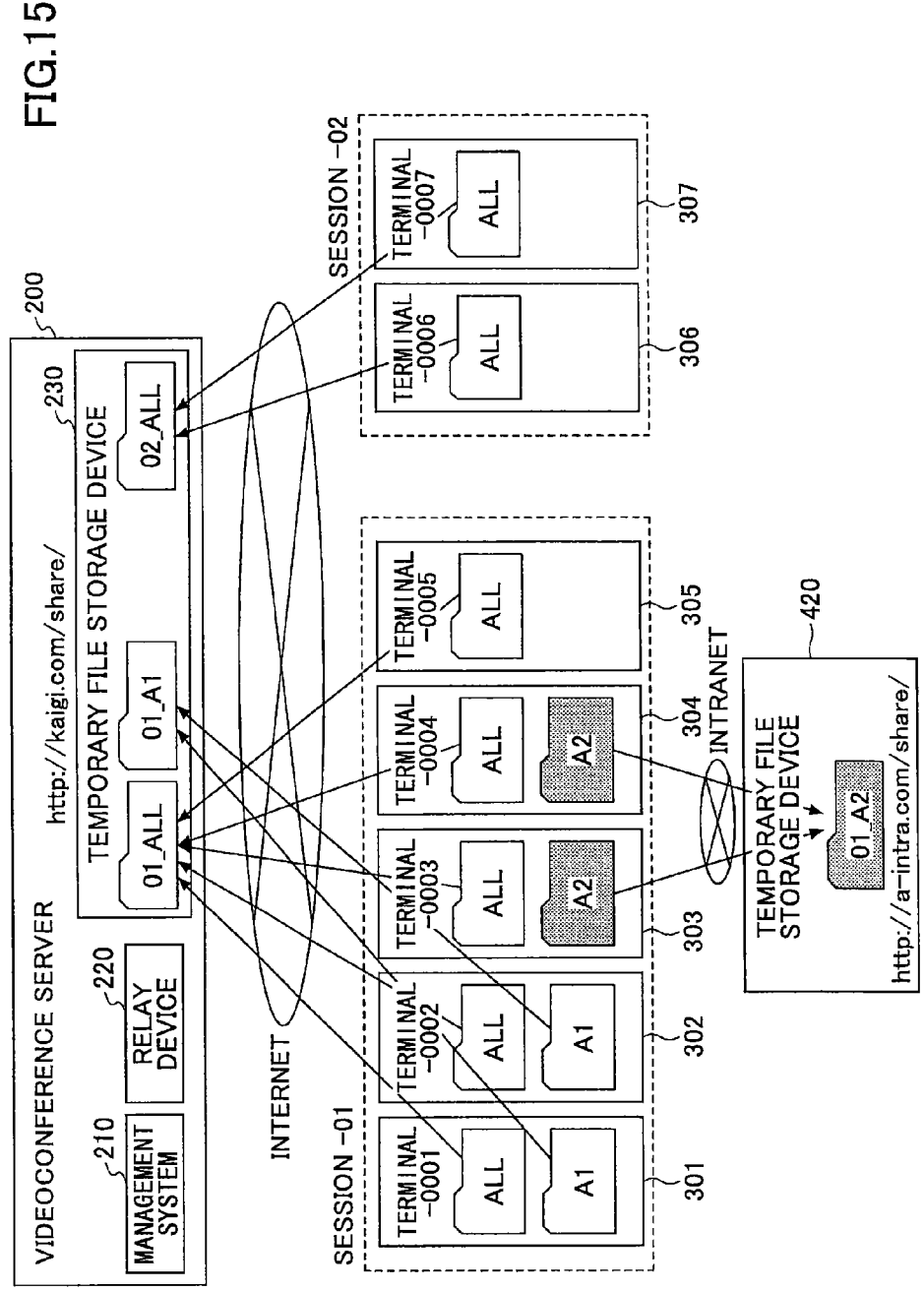
FIG. 15 is a diagram for explaining association between the terminals and the shared folders in the videoconference system according to the second embodiment.

FIG. 15 is a diagram for explaining association between terminals and shared folders in the videoconference system 100A according to the second embodiment.

In the videoconference system 100A, a shared folder may be created in both the temporary file storage device 420 connected to the intranet and the temporary file storage device 230 connected to the Internet.

In the example of FIG. 15, a group shared folder 01_A2 associated with group A2 to which the terminals 303 and 304 belong is created in the temporary file storage device 420 of the in-company server 400. For example, in the terminal management table, the terminal ID which identifies the terminal 300 may be associated with the type of network to which the terminal 300 is connected.

Next, the terminal management table in the videoconference system 100A according to the second embodiment is explained with reference to FIG. 16. FIG. 16 is a diagram showing an example of a terminal management table 61 in the videoconference system 100A according to the second embodiment.

As shown in FIG. 16, in the terminal management table 61, a terminal ID which identifies the terminal 300 is associated with the type of network to which the terminal 300 is connected, and a group name of a group which the terminal 300 belongs to. Namely, in this embodiment, the network type and the group name constitute the group identification information assigned to the terminal 300.

Next, a network management table in the videoconference system 100A according to the second embodiment is explained with reference to FIG. 17. FIG. 17 is a diagram showing an example of a network management table 90 in the videoconference system 100A according to the second embodiment.

As shown in FIG. 17, in the network management table 90, an intranet ID which identifies the intranet is associated with an intranet URI which is information which identifies a location of the intranet.

In this embodiment, the management system 210 is configured to create a group shared folder by checking the terminal management table 61 and the intranet management table 90.

Figure 18:
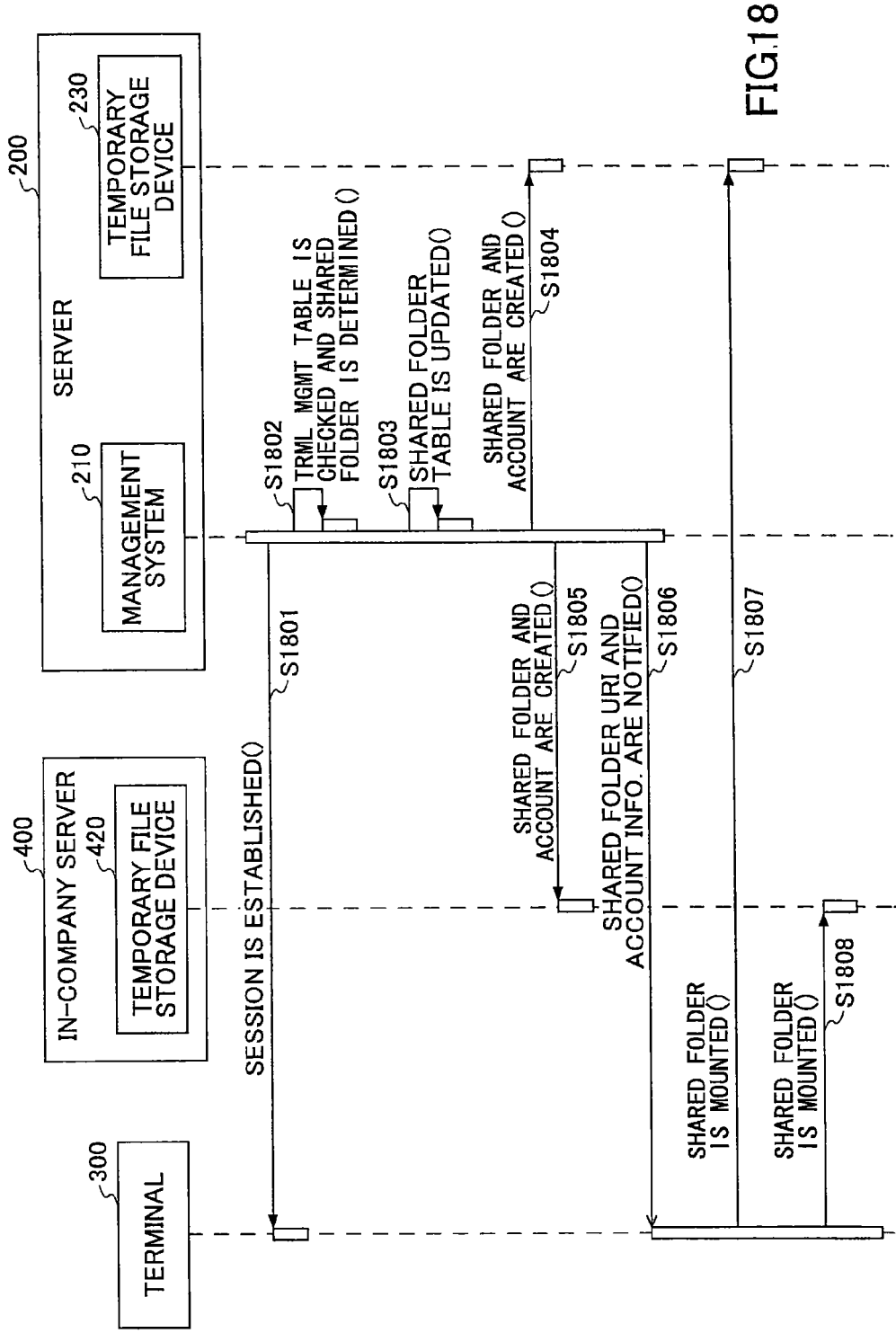
FIG. 18 is a sequence diagram for explaining operation of a videoconference server according to the second embodiment.

Next, operation of the videoconference system 100A according to the second embodiment to exchange information between the videoconference server 200 and the terminal 300 is explained with reference to FIG. 18. FIG. 18 is a sequence diagram for explaining the operation of the videoconference server according to the second embodiment.

When starting a videoconference in the videoconference system 100A, the management system 210 of the videoconference server 200 establishes a session with the terminal 300 which participates in the videoconference (step S1801). Subsequently, the management system 210 determines a group shared folder to be created by checking the terminal management table 61 (step S1802). A detailed process of step S1802 will be described later.

After the group shared folder to be created is determined in step S1802, the management system 210 updates the shared folder table 70 (step S1803). Subsequently, the management system 210 creates account information of the group shared folder and the group shared folder in the temporary file storage device 230 (step S1804). In this embodiment, in step S804, a shared folder which is shared by all the terminals 300 participating in the same videoconference may be created in the temporary file storage device 230 in addition to the group shared folder.

Further, when the location of the group shared folder to be created is the in-company server 400, the management system 210 creates account information of the group shared folder and the group shared folder in the temporary file storage device 420 of the in-company server 400 (step S1805).

Subsequently, the management system 210 checks the shared folder table 70 and the terminal 300 is notified of the shared folder URI of the shared folder, the shared folder URI of the group shared folder, and the account information for accessing the shared folder (step S1806). Subsequently, the terminal 300 mounts the shared folder and the group shared folder in the temporary file storage device 230 (step S1807). Further, the terminal 300 mounts the group shared folder in the temporary file storage device 420 (step S1808).

Figure 19:
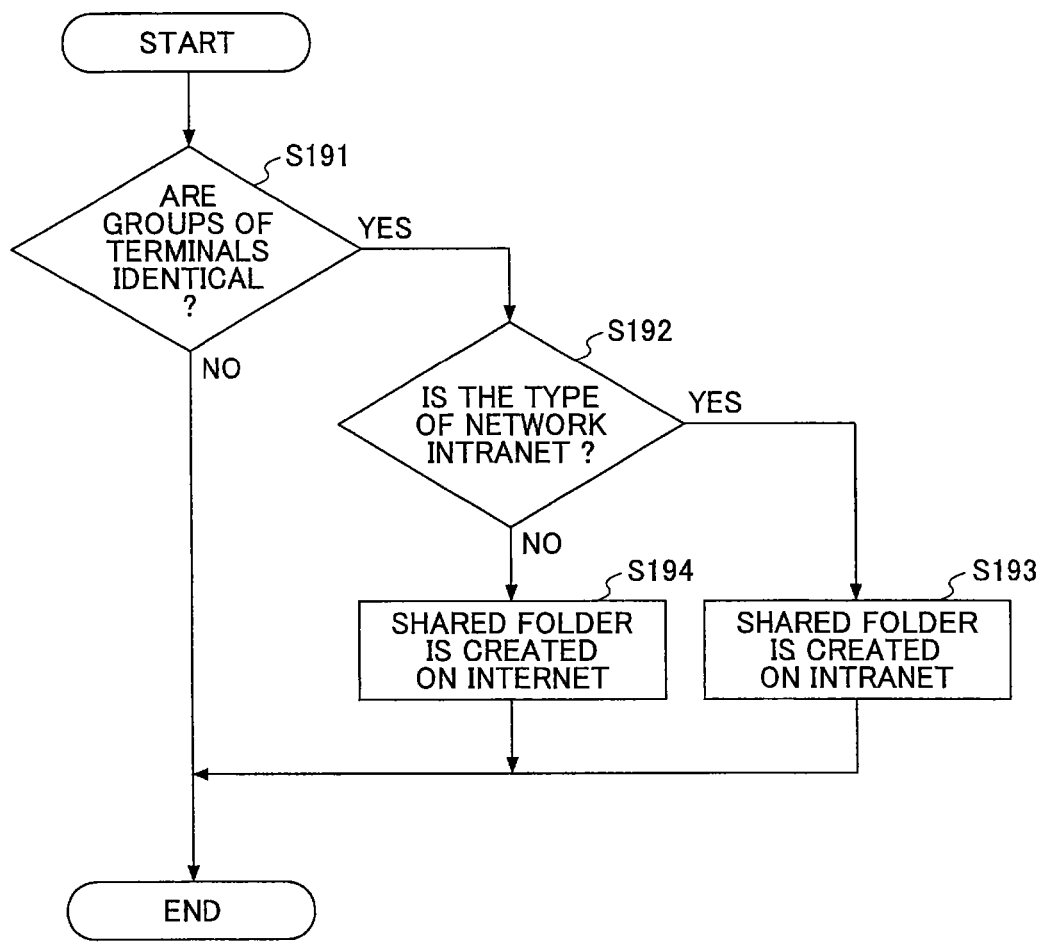
FIG. 19 is a flowchart for explaining a process to determine a shared folder to be created in the videoconference system according to the second embodiment.

Next, a detailed process of step S1802 is explained with reference to FIG. 19. FIG. 19 is a flowchart for explaining a process to determine a shared folder to be created in the videoconference system 100A according to the second embodiment.

As shown in FIG. 19, the management system 210 checks the terminal management table 61 and determines whether a newly participating terminal 300 belongs to a group identical to an existing group of a terminal 300 in the terminals 300 participating in the videoconference (step S191).

When the terminal 300 is determined as belonging to the group in step S191, the management system 210 checks the terminal management table 61 and determines whether the type of network of the terminal's same group is the same as that of the newly participating terminal 300 (step S192). When the terminal's same group is determined as not existing in step S191, the management system 210 terminates the process of FIG. 19 without determining the group shared folder to be created.

When the type of network of the terminal's same group is the same as that of the newly participating terminal 300 (the intranet) in step S192, the management system 210 determines the group shared folder is to be created on the intranet (step S193). When the type of network of the terminal's same group is not the same as that of the newly participating terminal 300 (the Internet) in step S192, the management system 210 determines the group shared folder is to be created on the Internet (step S194).

Referring back to FIGS. 7, 16 and 17, a concrete example is explained in order to facilitate the understanding of the process shown in FIG. 19. Suppose a case in which the terminal 302 is newly connected to the videoconference server 200 in order to participate in the videoconference of session ID 01. It is assumed that the session between the terminal 301 and the videoconference server 200 is already established at this time.

In this case, the management system 210 checks the terminal management table 61 and receives a terminal ID 0002 of the terminal 302 and a group name associated with the terminal ID of the terminal 302. In this example, the group name of the terminal 302 is A1 as shown in FIG. 6. Subsequently, the management system 210 determines whether a terminal 300 belonging to group A1 (identical to the group of the terminal 302 newly participating in the videoconference) exists among the terminals 300 already participating in the videoconference of session ID 01. In this example, the terminal 301 is determined as belonging to group A1 and participating in the videoconference.

Subsequently, the management system 210 checks the terminal management table 61 and determines whether the type of network of the terminal's 301 same group is the same as that of the newly participating terminal 302. In this example, the type of network of the terminal 301 is the Internet, the type of network of the terminal 302 is also the Internet, and the network types of the two terminals are in agreement. Therefore, the management system 210 determines the group shared folder to be created in the temporary file storage device 230 and to be shared by the group-A1 terminals 301 and 302. Then, the management system 210 sends to the group-A1 terminals 301 and 302 a notification of the shared folder URI and the account information of the created group shared folder.

Next, a case in which the terminal 300 participates midway through the videoconference in the videoconference system 100A according to the second embodiment is explained. A process performed by the videoconference system 100A when the terminal 300 participates midway through the videoconference is essentially the same as that shown in FIG. 18 except the process of step S1802 in FIG. 18. When creation of a group shared folder is not needed, the management system 210 performs only the updating of the shared folder table 70 in step S1803.

Figure 20:
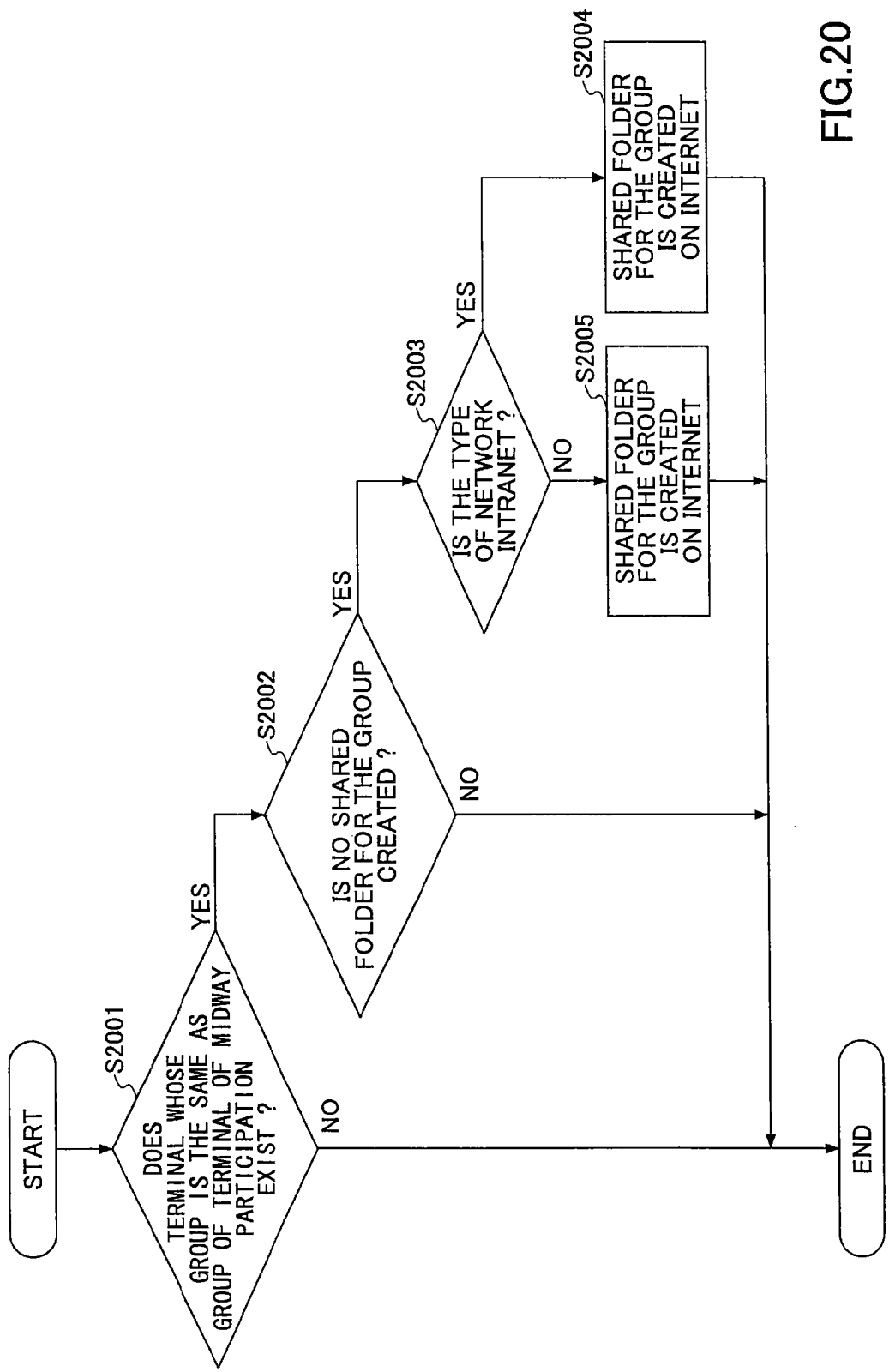
FIG. 20 is a flowchart for explaining a process to determine a shared folder to be created when a terminal participates midway through a videoconference in the videoconference system according to the second embodiment.

Next, the process performed by the videoconference system 100A when the terminal 300 participating midway through the videoconference is explained. FIG. 20 is a flowchart for explaining a process to determine a shared folder to be created when a terminal participates midway through the videoconference in the videoconference system 100A according to the second embodiment.

After a session between the terminal 300 participating midway through the videoconference and the videoconference server 200 is established, the management system 210 determines whether a terminal 300 whose group is the same as the group of the terminal 300 of midway participation exists among the terminals 300 already participating in the videoconference (step S2001). Specifically, the management system 210 checks the terminal management table 60 and the shared folder table 70, and determines whether a terminal 300 whose group is the same as the group of the terminal 300 of midway participation exists among the terminals 300 already participating in the videoconference.

When the terminal's 300 same group is determined as not existing in step S2001, the management system 210 terminates the process of FIG. 20. When the terminal's 300 same group is determined as existing in step S2001, the management system 210 determines whether a group shared folder associated with the group of the terminal 300 of midway participation is not yet created by the temporary file storage device 230 or the temporary file storage device 420 (step S2002).

When the corresponding group shared folder is already created in step S2002, the management system 210 terminates the process of FIG. 20. When no corresponding group shared folder is created in step S2002, the management system 210 checks the terminal management table 61 and determines whether the type of network of the terminal's 300 same group is the intranet (step S2003).

When the type of network of the terminal's 300 same group is the intranet in step S2003, the management system 210 determines the group shared folder is to be created on the intranet (step S2004). When the type of network of the terminal's 300 same group is not the intranet in step S2003, the management system 210 determines the group shared folder is to be created on the Internet (step S2005).

As described above, in this embodiment, the location where the group shared folder shared by the terminals 300 same group is created may be determined based on the kind of connection between the terminal 300 and the temporary file storage device 230 or 420. For example, in this embodiment, the group shared folder may be created by the in-company server on the intranet.

In a case in which a videoconference is held between several different companies using the videoconference system 100A, the terminals 300 for each company may be made to belong to one group and a group shared folder associated with each group may be created by an in-company server of a corresponding group. For example, in this embodiment, the terminals 300 may be divided into a group hosting confidential data and a group hosting non-confidential data, and a group shared folder associated with the former group may be created on the intranet.

In the videoconference system according to the second embodiment, the security regarding sharing of data may be increased.

Third Embodiment

Next, a videoconference system 100B according to a third embodiment is explained. The videoconference system 100B is essentially the same as the videoconference systems 100 and 100A according to the first and second embodiments except that a communication terminal 300A in which the terminal 300 and the PC 310 are integrated is utilized. In the following, only the points of the videoconference system 100B differing from the videoconference system 100 will be described. The elements and devices of the videoconference system 100B which are essentially the same as corresponding elements and devices of the video conference system 100 are designated by the same reference numerals, and a description thereof will be omitted.

Figure 21:
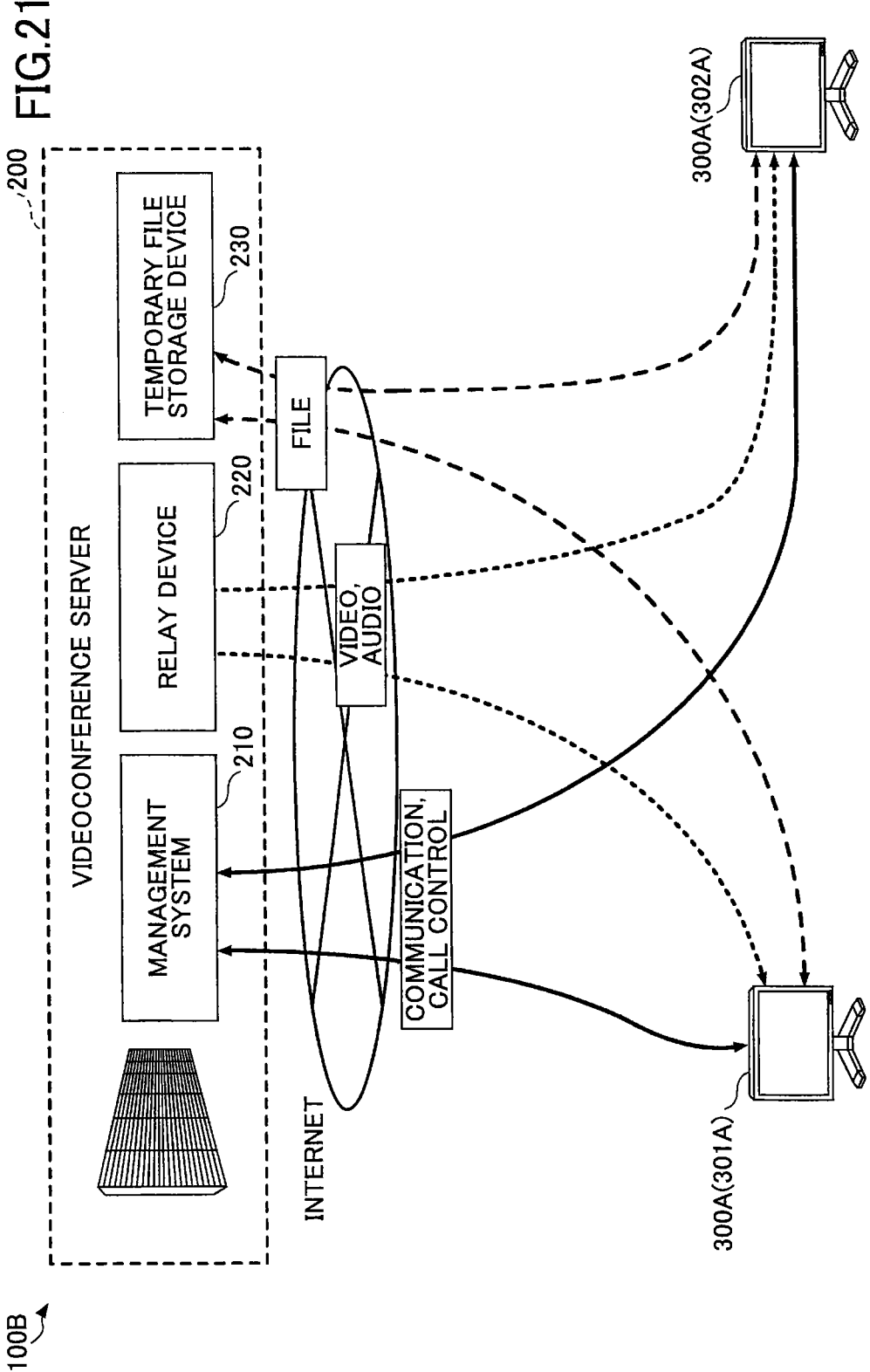
FIG. 21 is a diagram showing a composition of a videoconference system according to a third embodiment.

FIG. 21 is a diagram for explaining a composition of the videoconference system 100B according to the third embodiment. The videoconference system 100B includes the videoconference server 200 and two or more communication terminals 300A.

For example, the terminal 300A is a terminal in which a microphone, a speaker, a camera, etc. are integrated on a general-purpose computer. In this embodiment, a general-purpose computer is used as the terminal 300A including no dedicated terminal. Examples of the general-purpose computer include a smart phone, a mobile phone, a tablet terminal, etc.

In this embodiment, grouping of the terminals 300A is performed based on attribute information indicating attributes of each terminal 300A. Namely, in this embodiment, the attribute information indicating the attributes of each terminal 300A constitutes the group identification information assigned to the terminal 300A.

FIG. 22 is a diagram showing an example of a terminal management table 62 in the videoconference system 100B according to the third embodiment. As shown in FIG. 22, in the terminal management table 62, a terminal ID which identifies each terminal 300A is associated with a first attribute of the terminal 300A, and a second attribute of the terminal 300A.

In this embodiment, a user ID assigned to the terminal 300A is used as the terminal ID, an office name of a company office to which a corresponding user of the user ID belongs is used as the first attribute, and a section name of a company section to which the corresponding user of the user ID belongs is used as the second attribute.

In this embodiment, information of any other type that identifies the terminal 300A may be used instead as the terminal ID. Namely, in the terminal management table 62, the information of any other type that identifies the terminal 300A may be associated with the first attribute and the second attribute as a key.

For example, the management system 210 may be configured such that the user ID and the information which identifies the terminal 300A used by a corresponding user of the user ID are associated and stored, and the terminal 300A may be designated using the user ID. The information which identifies the terminal 300A may be the terminal ID, or may be the information (IP address) which indicates a location of the terminal 300A.

In this embodiment, the management system 210 determines the terminals 300A with the same office name and the same section name as belonging to one group. For example, in the example of FIG. 22, the terminal 300A of USER-1 (user ID: 1) and the terminal 300A of USER-2 (user ID: 2) are associated with the same office name and the same section name. Therefore, the management system 210 determines the two terminals 300A as belonging to one group and creates a corresponding group shared folder. Alternatively, the management system 210 may determine the terminals 300A associated with the same section name only as belonging to one group.

As described above, in this embodiment, the attribute information is used as the information for grouping of the terminals 300A and the videoconference system 100B according to this embodiment may create a group shared folder based on the attribute information.

Fourth Embodiment

Next, a videoconference system 100C according to a fourth embodiment is explained. The videoconference system 100C is essentially the same as the videoconference system 100 according to the first embodiment except that a shared folder name is created when a shared folder is created. In the following, only the points of the videoconference system 100C differing from the videoconference system 100 will be described. The elements and devices of the videoconference system 100C which are essentially the same as corresponding elements and devices of the video conference system 100 are designated by the same reference numerals, and a description thereof will be omitted.

Figure 23:
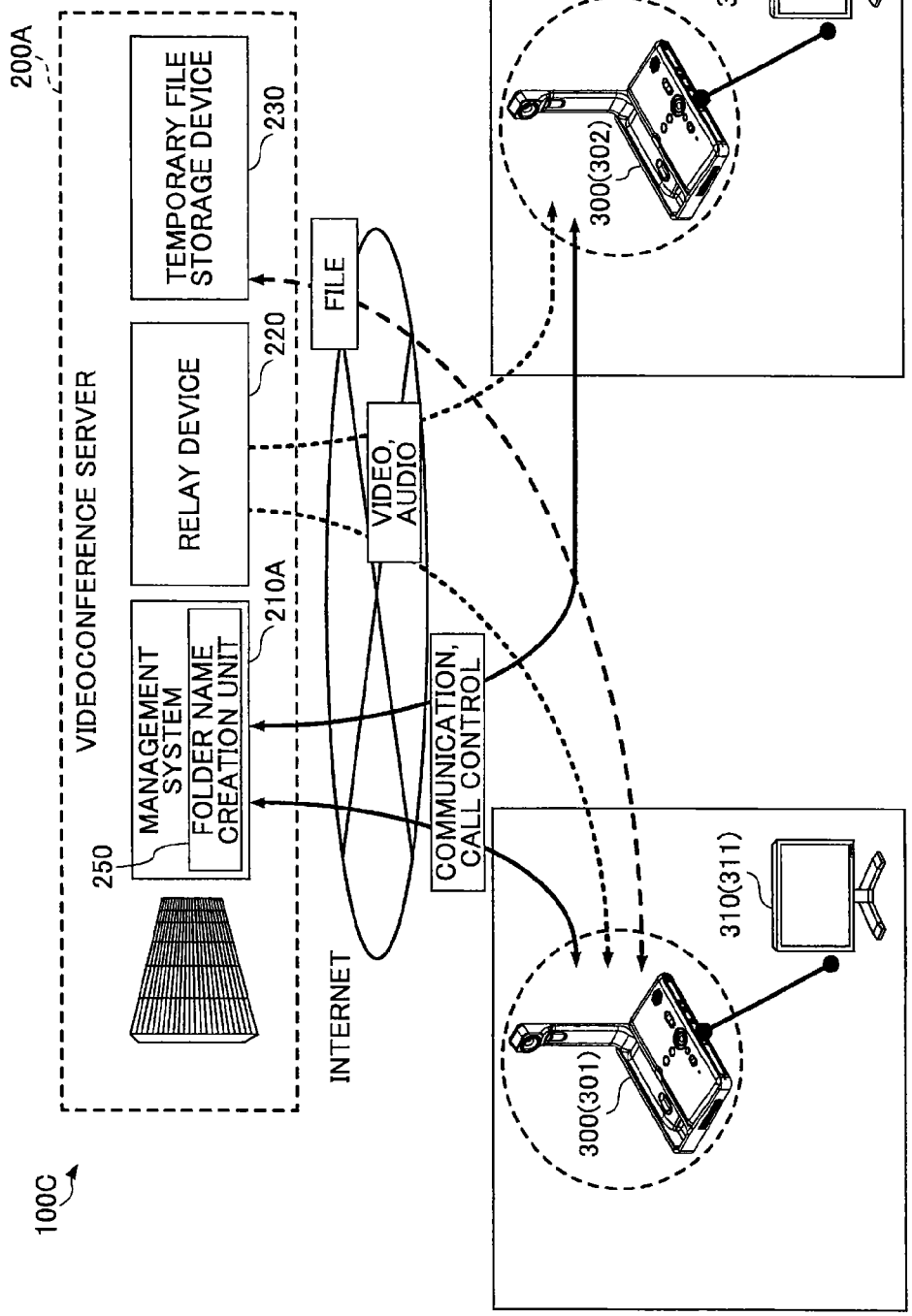
FIG. 23 is a diagram showing a composition of a videoconference system according to a fourth embodiment.

FIG. 23 is a diagram showing a composition of the videoconference system 100C according to the fourth embodiment. As shown in FIG. 23, the videoconference system 100C includes a videoconference server 200A and two or more sets of terminals 300 and PCs 310, the videoconference server 200A includes a management system 210A, a relay device 220, and a temporary file storage device 230, and the management system 210A includes a folder name creation unit 250.

The folder name creation unit 250 is configured to create a name of a shared folder which is created by the management system 210A. The management system 210A is configured to notify to the terminal 300 the shared folder URI, the account information, and the shared folder name created by the folder name creation unit 250.

Next, creation of a shared folder name by the folder name creation unit 250 is explained. For example, the folder name creation unit 250 may create a folder name for each of a shared folder and a group shared folder. Note that the shared folder is a folder shared by all the terminals 300 participating in a videoconference of a certain session ID, and the group shared folder is also a shared folder for each of the groups of the terminals 300 participating in a videoconference of a certain session ID.

For example, the folder name creation unit 250 includes a table associating a setting method and a folder name of a shared folder, and a table associating a setting method and a folder name of a group shared folder. The folder name creation unit 250 checks these tables and creates a shared folder name.

FIG. 24 is a diagram showing an example of a table 24 associating a setting method and a folder name of a shared folder. As shown in FIG. 24, the "SETTING METHOD" column of the table 24 includes "FIXED NAME". The "FIXED NAME" setting method means that a folder name of a shared folder once created is fixed and remains unchanged until a videoconference is completed. The "FOLDER NAME" column of the table 24 includes three options: "ALL", "FOLDER ACCESSIBLE FROM ALL TERMINALS", and "(USER-DEFINED)". The "(USER-DEFINED)" folder name means that, when selected from the options, a shared folder name arbitrarily predetermined by the user is created.

For example, when creating a shared folder name by checking the table 24, the folder name creation unit 250 may display on the terminal 300 a list of folder name options included in the table 24, and may prompt a user of the terminal 300 to select a folder name from the list of folder name options displayed on the terminal 300 so that the selected folder name is created. Subsequently, the folder name creation unit 250 may send to the terminal 300 a notification of the selected folder name, the account information, and the URI of the shared folder. When the folder name is received at the terminal 300, the folder name associated with the shared folder is displayed on the terminal 300.

FIG. 25 is a diagram showing an example of a table 25 associating a setting method and a folder name of a group shared folder. As shown in FIG. 25, the "SETTING METHOD" column of the table 25 includes "FIXED NAME", "ACCESSIBLE TERMINAL ID", and "ACCESSIBLE TERMINAL NAME". The "ACCESSIBLE TERMINAL ID" setting method means that one or more terminal IDs of one or more terminals other than the user's terminal which can be accessed by the user's terminal are set as a group shared folder name. The "ACCESSIBLE TERMINAL NAME" setting method means that one or more terminal names of one or more terminals other than the user's terminal which can be accessed by the user's terminal are set as a group shared folder name.

The "FOLDER NAME" column of the table 25 for the "FIXED NAME" setting method includes three options: "GROUP NAME", "ACCESS-RESTRICTED FOLDER" name, and "(USER-DEFINED)" name (which is arbitrarily predetermined by the user).

The "FOLDER NAME" column of the table 25 for the "ACCESSIBLE TERMINAL ID" setting method includes one or more terminal IDs. For example, when the "ACCESSIBLE TERMINAL ID" setting method is designated, the folder name creation unit 250 creates the one or more terminal IDs received from the table 25 as the group shared folder name. Note that a terminal ID of the user's terminal may also be included in the "FOLDER NAME" column of the table 25 for the "ACCESSIBLE TERMINAL ID" setting method in addition to the one or more terminal IDs.

The "FOLDER NAME" column of the table 25 for the "ACCESSIBLE TERMINAL NAME" setting method includes one or more terminal names. For example, when the "ACCESSIBLE TERMINAL NAME" setting method is designated, the folder name creation unit 250 creates the one or more terminal names received from the table 25 as the group shared folder name. Note that a terminal name of the user's terminal may also be included in the "FOLDER NAME" column of the table 25 for the "ACCESSIBLE TERMINAL NAME" setting method in addition to the one or more terminal names.

For example, the folder name creation unit 250 may be configured to display on the terminal 300 a list of the folder name setting methods from the table 25 and prompt a user to select a folder name setting method from the list of the folder name setting methods displayed. The folder name creation unit 250 may be configured to create a group shared folder according to the selected folder name setting method. Note that the folder name setting method may be selected beforehand prior to a start of a videoconference.

In the above embodiment, the table 24 in which the method of setting a shared folder name is stored and the table 25 in which the method of setting a group shared folder name is stored are provided separately. The present disclosure is not limited to this method. For example, the table 24 and the table 25 may be provided as a combined table.

Figure 26:
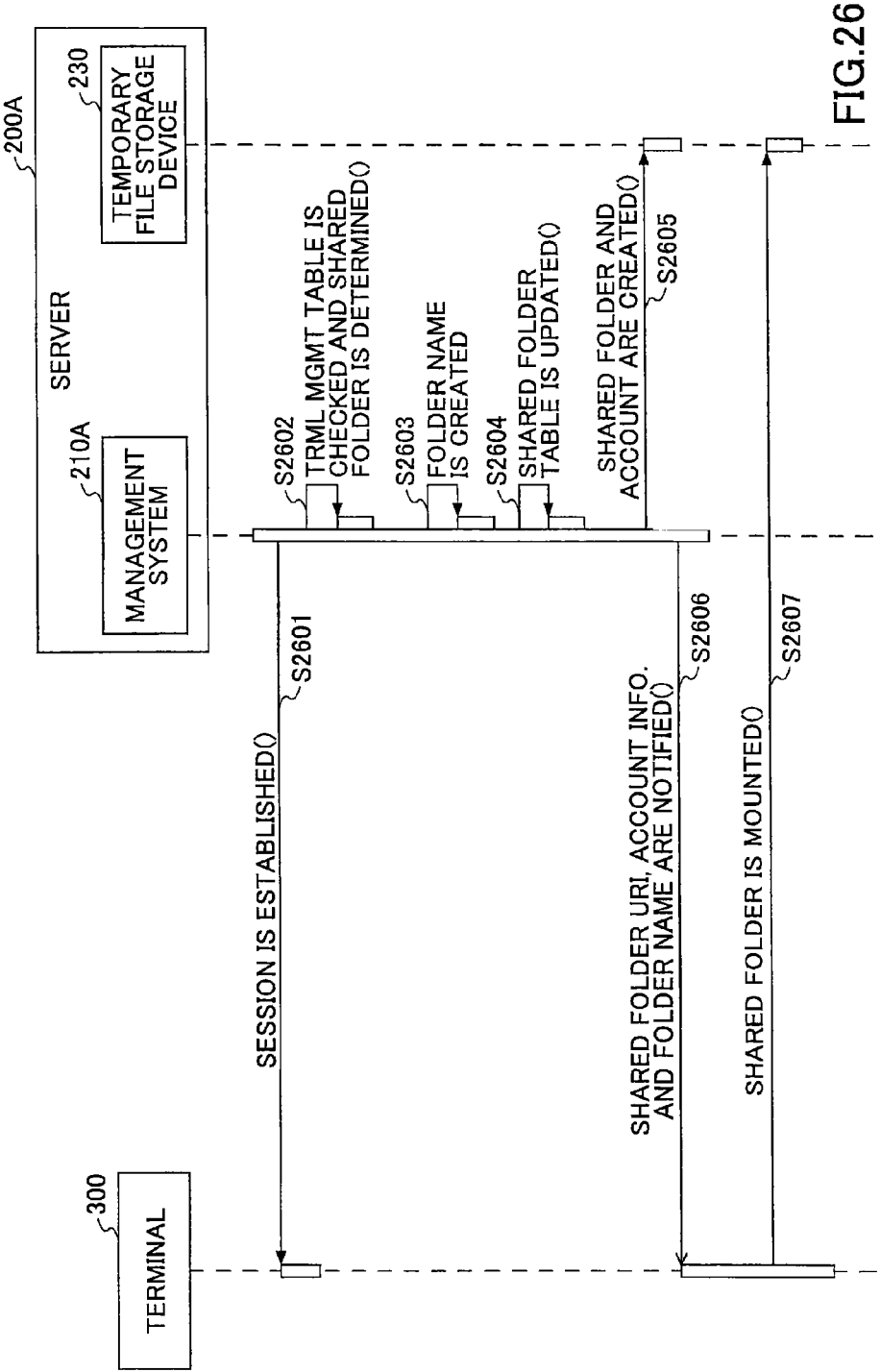
FIG. 26 is a sequence diagram for explaining operation of a videoconference server according to a fourth embodiment.

Next, operation of the videoconference server 200A according to the fourth embodiment is explained with reference to FIG. 26. FIG. 26 is a sequence diagram for explaining operation of the videoconference server 200A. In the videoconference server 200A, the management system 210A includes the folder name creation unit 250 (not illustrated).

The process of steps S2601 and S2602 in FIG. 26 is the same as the process of steps S801 and S802 in FIG. 8, and therefore a description thereof will be omitted.

As shown in FIG. 26, after the group shared folder to be created is determined in step S2602, the management system 210A causes the folder name creation unit 250 to check the table 25 and create a shared folder name based on the selected folder name setting method (step S2603). Subsequently, the management system 210A updates the shared folder table 70 (step S2604). A detailed process of updating the shared folder table 70 in step S2602 will be described later.

Subsequently, the management system 210A creates account information of the group shared folder and the group shared folder in the temporary file storage device 230 (step S2605).

Subsequently, the management system 210A checks the shared folder table 70 and notifies to the terminal 300 the shared folder URI of the shared folder, the shared folder URI of the group shared folder, the account information for accessing the shared folder, and the created group shared folder name (step S2606).

Subsequently, the terminal 300 mounts the group shared folder and its folder name in the temporary file storage device 420 (step S2607). At this time, the group shared folder and its folder name are displayed on the terminal 300.

Next, updating of the shared folder table 70 is explained with reference to FIGS. 27A and 27B. FIGS. 27A and 27B are diagrams for explaining updating of the shared folder table in the videoconference server 200A according to the fourth embodiment. FIG. 27A shows a state of the shared folder table 70C before updating, and FIG. 27B shows a state of the shared folder table 70D after updating.

In the example of FIGS. 27A and 27B, it is assumed that the terminal 304 participates midway through the videoconference of session ID 01 in which the terminals 301-303 already participate.

In the shared folder table 70C shown in FIG. 27A, among the terminals 300 participating in the videoconference of session ID 01, the terminals 301 and 302 belong to group A1. Therefore, a shared folder shared by all the terminals 300 participating in the videoconference of session ID 01, and a group shared folder associated with group A1 are created in the temporary file storage device 230.

Further, in the shared folder table 70C, an additional column "FOLDER NAME" is provided to indicate a shared folder name. In the example of the shared folder table 70C, the folder name of the shared folder and the folder name of the group shared folder associated with group A1, both created by the folder name creation unit 250, are included in the "FOLDER NAME" column.

Specifically, in the example of FIG. 27A, "ALL" is indicated as the folder name of the shared folder, and the terminal IDs "001,002" of the terminals which may access the group shared folder associated with group A1 are indicated as the folder name of the group shared folder associated with group A1.

If a terminal 304 participates midway through the videoconference, the management system 210A checks the terminal management table 60 and obtains a group name of a group which the terminal 304 belongs to. In the example, the terminal 304 belongs to group A2 and the management system 210A obtains A2 from the terminal management table 60.

Subsequently, the management system 210A determines whether a terminal belonging to group A2 exists among the terminals 301-303 already participating in the videoconference. In the example of FIG. 27B, the terminal 303 belonging to group A2 exists among the terminals 301-303.

Hence, the management system 210A creates a group shared folder associated with group A2 and a folder name of the group shared folder, and updates the shared folder table 70C to create the shared folder table 70D.

In the shared folder table 70D of FIG. 27B, the folder name "003, 004" of the terminals which may access the group shared folder associated with group A2 is indicated as a folder name of the group shared folder associated with group A2.

In this embodiment, the terminal 300 is notified of the folder name, the shared folder URI, and the account information, and the group shared folder and its folder name are displayed on the terminal 300.

As described above, in this embodiment, the folder name is created and the terminal 300 is notified, and a user of the terminal 300 may easily recognize folder names or IDs of shared folders on an accessible terminal that may be accessed by the user's terminal with a display indication thereof. Further, the user of the terminal 300 may easily designate by visual inspection the shared folders on the accessible terminal that may be accessed by the user's terminal.

In this embodiment, the folder name or ID is information identifying a group shared folder (shared memory area) shared for each group. Hence, the folder name creation unit 250 creates the identification information of the shared memory area, and functions to associate the identification information with the shared folder location information (URI) indicating the location of the shared memory area.

Further, in this embodiment, the information indicating whether a group shared folder exists on the Internet or on the intranet may be included in a folder name. For example, a specific character string ("intra_") may be placed in front of the folder name only when the group shared folder exists on the intranet. In this case, for example, when a group shared folder of attribute A1 exists on the intranet, the information to be placed in front of the folder name of the group shared folder may be represented by "intra_A1".

Further, in this embodiment, a numeral character indicating the number of terminals which may be accessed by the user's terminal may be placed in front of a folder name so that a user of the terminal 300 may grasp the number of the accessible terminals on which a group shared folder is created. For example, in the above example, the group shared folder of attribute A1 may be accessed from two terminals: terminal ID 003 and terminal ID 004. In such a case, the folder name creation unit 250 may create "(2)_A1 company" as the group shared folder name, which means that the group shared folder of attribute A1 may be accessed from the two terminals (terminal ID 003 and terminal ID 004).

Fifth Embodiment

Next, a videoconference server 200A according to a fifth embodiment is explained. The videoconference server 200A according to this embodiment is essentially the same as the videoconference server 200A according to the fourth embodiment except that a shared folder name is created by the terminal 300. In the following, only the points of the videoconference server 200A according to the fifth embodiment differing from the videoconference server 200A according to the fourth embodiment will be described. The elements and devices of the videoconference server 200A according to the fifth embodiment which are essentially the same as corresponding elements and devices of the videoconference server 200A according to the fourth embodiment are designated by the same reference numerals, and a description thereof will be omitted.

FIG. 28 is a sequence diagram for explaining operation of the videoconference server 200A according to the fifth embodiment.

The process of steps S2801-S2804 in FIG. 28 is the same as the process of steps S801-S804 in FIG. 8, and therefore a description thereof will be omitted.

As shown in FIG. 28, following step S2804, the management system 210A of this embodiment checks the shared folder table 70 and notifies to the terminal 300 the information associated with the terminal ID (step S2805). Specifically, the management system 210A sends to the terminal 300 a notification of the group name, the shared folder URI, the account name, and the password which are associated with the terminal ID.

Subsequently, the terminal 300 creates folder names of the shared folders based on the received information (step S2806). Specifically, the terminal 300 creates a folder name of the shared folder and a folder name of the group shared folder.

In this embodiment, the tables 24 and 25 (see FIGS. 24 and 25) are stored in the terminal 300, and, when the notification is received from the management system 210A in step S2805, the terminal 300 checks the tables 24 and 25 and creates the folder names. Note that the setting method of the folder names may be selected beforehand in the terminal 300.

Subsequently, the terminal 300 mounts the shared folder and the group shared folder in the temporary file storage device 230 (step S2807).

The terminal 300 may send a notification of the folder names to the management system 210 after the folder names are created. After the folder names are received from the terminal 300, the management system 210 may update the shared folder table 70 by adding the received folder names to the shared folder table 70.

As described in the foregoing, in the communication server according to the present invention, data may be safely shared between the terminals of the communication partners.

The communication server according to the present invention may be implemented in any convenient form, for example, using dedicated hardware, or a mixture of dedicated hardware and software. The present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the present invention may be implemented as software, each and each aspect of the present invention thus encompasses computer software implementable on a programmable device.

The computer software may be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, and a network device depending on the type of the apparatus. Alternatively, the HDD may be provided external to the apparatus as long as the HDD is accessible from the apparatus. In this example, the CPU, such as a cache memory of the CPU, and the RAM may operate as a physical memory or a primary memory of the apparatus, while the HDD may operate as a secondary memory of the apparatus.

The communication server according to the present invention is not limited to the above-described embodiments, and variations and modifications may be made without departing from the scope of the present invention.

The present application is based upon and claims the benefit of priority of Japanese Patent Application No. 2013-049213, filed on Mar. 12, 2013, the contents of which are incorporated herein by reference in their entirety.

What is claimed is:

1. A communication server connected to a plurality of terminals participating in a videoconference to manage communications between the plurality of terminals, comprising:
    a checking unit configured to check a terminal management table which associates terminal identification data to identify each of the plurality of terminals with group identification data to identify each of groups to which the plurality of terminals belong respectively;
    a determination unit configured to determine whether group identification information of a first terminal in the plurality of terminals and group identification information of a second terminal in the plurality of terminals are a same as each other based on the group identification data;
    an updating unit configured to update a shared location table including shared location information indicating a location of a shared memory area shared by the same group when the group identification information of the first terminal and the group identification information of the second terminal are determined as being the same as each other;
    a memory access information creation unit configured to create memory access information for accessing the shared memory area to associate the shared memory area and the memory access information; and
    a notification unit configured to send a notification of the shared location information and the memory access information to the same group.

2. The communication server according to claim 1, wherein the shared location table includes videoconference identification information to identify the videoconference, the shared location information, terminal identification information to identify terminals mounting the shared memory area, and group information to identify a group to which the terminals mounting the shared memory area belong.

3. The communication server according to claim 2, wherein the group information includes a predetermined group name to identify the group to which the terminals mounting the shared memory area belong, and attribute information indicating a type of network of the terminals.

4. The communication server according to claim 1, wherein the shared memory area is provided in a storage device connected to the communication server.

5. The communication server according to claim 4, further comprising a deletion table in which group identification information of each of the plurality of terminals is associated with information indicating whether the shared memory area is to be deleted or not,
    wherein, when the videoconference is completed and the plurality of terminals participating in the videoconference are disconnected from the communication server, the deletion table is checked and it is determined whether the shared memory area associated with the group identification information is deleted based on the deletion table.

6. The communication server according to claim 1, further comprising a table in which a list of setting methods of the memory access information is stored,
    wherein the identification information creation unit is configured to create the memory access information based on a setting method selected from the list of setting methods in the table.

7. The communication server according to claim 6, wherein the list of setting methods includes a method of making the memory access information a group name of a group of terminals which share the shared memory area, and a method of making the memory access information a list of identifiers of the terminals belonging to the same group and sharing the shared memory area.

8. A communication system including a communication server which is connected to a plurality of terminals participating in a videoconference to manage communications between the plurality of terminals, the communication server comprising:
- a checking unit configured to check a terminal management table which associates terminal identification data to identify each of the plurality of terminals with group identification data to identify each of groups to which the plurality of terminals belong respectively;
- a determination unit configured to determine whether group identification information of a first terminal in the plurality of terminals and group identification information of a second terminal in the plurality of terminals are a same as each other based on the group identification data;
- an updating unit configured to update a shared location table including shared location information indicating a location of a shared memory area shared by the same group when the group identification information of the first terminal and the group identification information of the second terminal are determined as being the same as each other;
- a memory access information creation unit configured to create memory access information for accessing the shared memory area to associate the shared memory area and the memory access information; and
- a notification unit configured to send a notification of the shared location information and the memory access information to the same group.

9. A communication method performed by a communication server which is connected to a plurality of terminals participating in a videoconference to manage communications between the plurality of terminals, comprising:
- checking, by a checking unit, a terminal management table which associates terminal identification data to identify each of the plurality of terminals with group identification data to identify each of groups to which the plurality of terminals belong respectively;
- determining, by a determination unit, whether group identification information of a first terminal in the plurality of terminals and group identification information of a second terminal in the plurality of terminals are a same as each other based on the group identification data;
- updating, by an updating unit, a shared location table including shared location information indicating a location of a shared memory area shared by the same group when the group identification information of the first terminal and the group identification information of the second terminal are determined as being the same as each other;
- creating, by a memory access information creation unit, memory access information for accessing the shared memory area to associate the shared memory area and the memory access information; and
- notifying, by a notification unit, the shared location information and the memory access information to the same group.

* * * * *